US011442591B2

(12) United States Patent
Vathauer et al.

(10) Patent No.: US 11,442,591 B2
(45) Date of Patent: Sep. 13, 2022

(54) SYSTEM, METHOD, COMPUTER READABLE MEDIUM, AND VIEWER-INTERFACE FOR PRIORITIZED SELECTION OF MUTUALLY OCCLUDING OBJECTS IN A VIRTUAL ENVIRONMENT

(71) Applicant: LOCKHEED MARTIN CORPORATION, Bethesda, MD (US)

(72) Inventors: Jonathan E. Vathauer, Christmas, FL (US); Brandon P. Genesi, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 227 days.

(21) Appl. No.: 15/948,421

(22) Filed: Apr. 9, 2018

(65) Prior Publication Data

US 2019/0310756 A1 Oct. 10, 2019

(51) Int. Cl.
*G06F 3/00* (2006.01)
*G06F 3/04812* (2022.01)
(Continued)

(52) U.S. Cl.
CPC ...... *G06F 3/04812* (2013.01); *G06F 3/04815* (2013.01); *G06F 3/04883* (2013.01)

(58) Field of Classification Search
CPC ............. G06F 3/04812; G06F 3/04815; G06F 3/04882; G06F 3/048; G06F 3/04883
See application file for complete search history.

(56) References Cited

U.S. PATENT DOCUMENTS 5,162,779 A * 11/1992 Lumelsky ........... G06F 3/04812
345/419
5,448,690 A * 9/1995 Shiraishi ............... G06T 15/405
345/443

(Continued)

FOREIGN PATENT DOCUMENTS

EP 3141985 3/2017

OTHER PUBLICATIONS

International Search Report, dated Jul. 23, 2019.

*Primary Examiner* — Kieu D Vu
*Assistant Examiner* — Andrew Chung
(74) *Attorney, Agent, or Firm* — Foley & Lardner LLP

(57) ABSTRACT

A computer-implemented method comprising determining, by the processor, a set of objects of the plurality of objects having the shared coordinates $(X_S, Y_S)$ and at a location along the depth direction $(Z_S)$; and prioritizing, by the processor, an object from the set of objects based on at least two of metadata of the set of objects, screen areas of the set of objects, transparency of the set of objects, and opaqueness of at least one object of the set of objects currently displayed to improve the selection of at least one of mutually occluded objects and mutually partially occluded objects in the virtual environment. The method includes associating the prioritized object with the viewer input device for detecting interactions with the prioritized object displayed on the display device by the viewer input device. The prioritized object is updated on the screen of the display device based on the interactions.

18 Claims, 11 Drawing Sheets

(51) Int. Cl.
  *G06F 3/04883* (2022.01)
  *G06F 3/04815* (2022.01)

(56) References Cited

U.S. PATENT DOCUMENTS

| | | | | |
|---|---|---|---|---|
| 6,124,861 A * | 9/2000 | Lebovitz | G06F 3/04842 | 715/808 |
| 6,384,846 B1 * | 5/2002 | Hiroi | G09G 5/14 | 345/619 |
| 7,479,958 B1 * | 1/2009 | Suzuki | A63F 13/10 | 345/420 |
| 7,712,020 B2 * | 5/2010 | Khan | G10L 15/22 | 379/88.17 |
| 7,873,946 B2 * | 1/2011 | Lathrop | G06F 16/56 | 717/125 |
| 7,911,481 B1 * | 3/2011 | Ballagh | G09G 5/14 | 345/629 |
| 7,940,285 B2 * | 5/2011 | Would | G06F 3/0482 | 345/637 |
| 8,314,790 B1 * | 11/2012 | Zeiger | G06T 13/00 | 345/419 |
| 8,427,483 B1 * | 4/2013 | Ward | G06T 13/80 | 345/473 |
| 8,531,725 B2 * | 9/2013 | Morrison | G06T 11/40 | 358/1.9 |
| 8,533,615 B1 * | 9/2013 | Sams | G06F 9/5027 | 715/762 |
| 8,773,468 B1 * | 7/2014 | Ballagh | G09G 5/14 | 345/634 |
| 8,947,452 B1 * | 2/2015 | Ballagh | G06F 3/0486 | 345/420 |
| 9,152,173 B2 * | 10/2015 | Lee | G06F 3/017 | |
| 9,292,973 B2 | 3/2016 | Bar-Zeev et al. | | |
| 9,349,205 B2 * | 5/2016 | Beaver | G06T 13/80 | |
| 9,483,873 B2 | 11/2016 | Pennington et al. | | |
| 9,619,106 B2 * | 4/2017 | DeRose | G06F 3/04847 | |
| 10,222,949 B2 * | 3/2019 | Satou | G06F 11/3672 | |
| 10,664,528 B1 * | 5/2020 | Fraser | G06F 16/93 | |
| 2005/0204306 A1 * | 9/2005 | Kawahara | G06F 3/0481 | 715/782 |
| 2006/0017725 A1 * | 1/2006 | Fujiki | G06F 3/04845 | 345/419 |
| 2006/0136813 A1 * | 6/2006 | Hong | G06F 17/241 | 715/232 |
| 2006/0224992 A1 * | 10/2006 | Rossi | G06F 3/0481 | 715/781 |
| 2008/0136785 A1 * | 6/2008 | Baudisch | G06F 3/0488 | 345/173 |
| 2008/0307330 A1 * | 12/2008 | Louch | G06F 3/0483 | 715/763 |
| 2009/0138811 A1 * | 5/2009 | Horiuchi | G06F 3/04842 | 715/768 |
| 2009/0141966 A1 * | 6/2009 | Chen | G06T 19/006 | 382/154 |
| 2009/0217209 A1 * | 8/2009 | Chen | G06T 19/00 | 715/856 |
| 2009/0327953 A1 * | 12/2009 | Honkala | G06F 3/04817 | 715/804 |
| 2011/0093778 A1 * | 4/2011 | Kim | G06F 3/041 | 715/702 |
| 2011/0115721 A1 * | 5/2011 | Li | G06F 3/04883 | 345/173 |
| 2011/0181521 A1 * | 7/2011 | Reid | G06F 3/0483 | 345/173 |
| 2011/0281619 A1 * | 11/2011 | Cho | G06F 3/0486 | 455/566 |
| 2012/0113095 A1 * | 5/2012 | Hwang | G06F 3/04817 | 345/419 |
| 2012/0206452 A1 | 8/2012 | Geisner et al. | | |
| 2012/0240044 A1 * | 9/2012 | Johnson | G06F 3/04886 | 715/716 |
| 2012/0252484 A1 * | 10/2012 | Andrews | H04W 4/021 | 455/456.1 |
| 2013/0009891 A1 * | 1/2013 | Watanabe | G06F 3/0488 | 345/173 |
| 2013/0104065 A1 | 4/2013 | Stecher | | |
| 2013/0285920 A1 * | 10/2013 | Colley | G06F 3/0488 | 345/173 |
| 2014/0096092 A1 * | 4/2014 | Johnson | G06F 3/04883 | 715/863 |
| 2014/0189576 A1 * | 7/2014 | Carmi | G06F 3/0481 | 715/781 |
| 2014/0292754 A1 * | 10/2014 | Pennington | G06T 19/20 | 345/422 |
| 2014/0325455 A1 * | 10/2014 | Tobin | G06F 3/04815 | 715/850 |
| 2014/0358913 A1 * | 12/2014 | Cai | G06F 16/24578 | 707/728 |
| 2015/0052471 A1 * | 2/2015 | Chen | G06T 7/0012 | 715/771 |
| 2015/0062175 A1 * | 3/2015 | Kim | G09G 5/10 | 345/639 |
| 2015/0095798 A1 * | 4/2015 | Yang | G06F 3/0488 | 715/751 |
| 2015/0113483 A1 * | 4/2015 | Van Der Westhuizen | G06F 3/04812 | 715/850 |
| 2015/0234567 A1 * | 8/2015 | Wakatsuki | G06F 3/0482 | 715/852 |
| 2015/0235409 A1 * | 8/2015 | Grossman | G06F 3/0481 | 345/421 |
| 2015/0277700 A1 * | 10/2015 | He | G06F 3/04842 | 715/852 |
| 2015/0302827 A1 * | 10/2015 | Danielsson | G09G 5/026 | 345/581 |
| 2016/0041955 A1 * | 2/2016 | Costa | G06F 17/2247 | 715/234 |
| 2016/0260240 A1 * | 9/2016 | Meketa | G06T 19/20 | |
| 2016/0284126 A1 * | 9/2016 | Leppanen | G06F 3/013 | |
| 2016/0292895 A1 * | 10/2016 | Billi | G06T 11/60 | |
| 2016/0299660 A1 * | 10/2016 | Au | G06F 3/04842 | |
| 2017/0021273 A1 * | 1/2017 | Rios | A63F 13/69 | |
| 2017/0153789 A1 * | 6/2017 | Ogino | G06K 9/00355 | |
| 2017/0337705 A1 * | 11/2017 | Bendall | G01B 11/03 | |
| 2018/0018075 A1 * | 1/2018 | Heully | G06F 8/38 | |
| 2018/0096524 A1 * | 4/2018 | Ekambaram | G06T 17/20 | |
| 2018/0178597 A1 * | 6/2018 | Min | B60K 35/00 | |
| 2018/0210645 A1 * | 7/2018 | Schaefer | B60K 37/06 | |
| 2019/0179607 A1 * | 6/2019 | Thangarathnam | G06F 3/167 | |
| 2019/0243882 A1 * | 8/2019 | Fialkow | G06F 17/24 | |
| 2019/0279407 A1 * | 9/2019 | McHugh | G06F 3/0482 | |

* cited by examiner

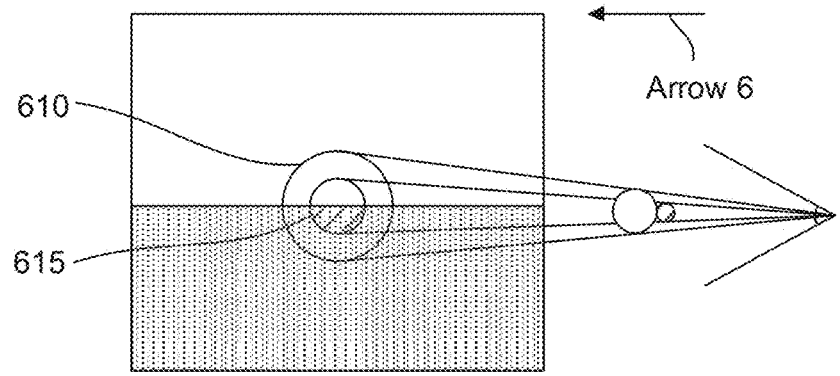
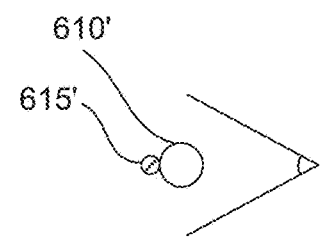
FIG. 6C
FIG. 6D
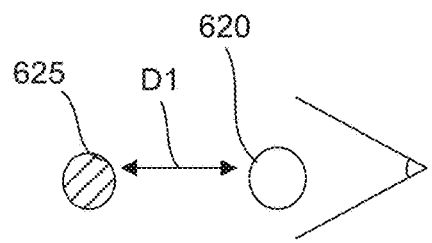
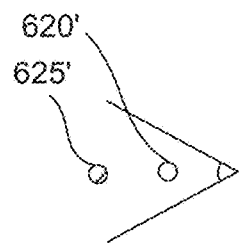
FIG. 6E
FIG. 6F
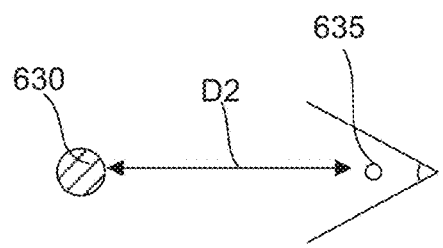
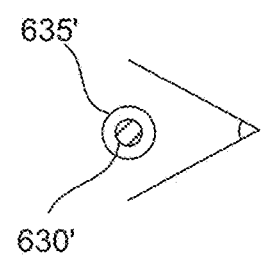
FIG. 6G
FIG. 6H

SYSTEM, METHOD, COMPUTER READABLE MEDIUM, AND VIEWER-INTERFACE FOR PRIORITIZED SELECTION OF MUTUALLY OCCLUDING OBJECTS IN A VIRTUAL ENVIRONMENT

BACKGROUND

Embodiments relate to a system, method, computer readable medium and viewer-interface for prioritized selection of mutually occluding objects in a virtual environment.

In a virtual maintenance trainer several components/assemblies are displayed on-screen at time and the viewer is required to select these items via input device (touchscreen, mouse, controller, etc.) using a cursor in order to interact with them. The assemblies depicted in a virtual maintenance trainer can be mechanically complex, having several small components or parts in small areas or overlapping each-other (bolts/washers, packings, seals, etc.). However, selecting the desired component based on cursor position alone can be non-intuitive and difficult for a viewer on these complex assemblies.

Some viewer interfaces require the viewer to hunt for occluded objects by repeatedly clicking and moving the cursor to a different location on the screen in an attempt to reveal and/or associate a cursor with a particular object being hunted for by the viewer.

SUMMARY

Embodiments relate to a system, method, computer readable medium and viewer-interface for prioritized selection of mutually occluding objects in a virtual environment.

An aspect of the embodiments includes a computer-implemented method comprising: detecting, by a processor coupled to the display, a point location of viewer selection by a viewer input device within a screen of a display device to determine shared coordinates $(X_S, Y_S)$ and a depth direction $(Z_S)$ associated with the shared coordinates $(X_S, Y_S)$, the display device displaying a virtual environment having a plurality of objects wherein some objects of the plurality of objects when displayed on the display device are mutually occluded objects or partially occluded objects. The method comprises determining, by the processor, a set of objects of the plurality of objects having the shared coordinates $(X_S, Y_S)$ and at a location along the depth direction $(Z_S)$; and prioritizing, by the processor, an object from the set of objects based on at least two of metadata of the set of objects, screen areas of the set of objects, transparency of the set of objects, and opaqueness of at least one object of the set of objects currently displayed to improve the selection of at least one of mutually occluded objects and mutually partially occluded objects in the virtual environment. The method includes associating, by the processor, the prioritized object with the viewer input device for detecting interactions with the prioritized object displayed on the display device by the viewer input device, the prioritized object being updated on the screen of the display device based on the interactions.

Another aspect of the embodiments includes tangible and non-transitory computer readable medium having program instructions which when executed by a processor causes the processor to: detect a point location of viewer selection by a viewer input device within a screen of a display device to determine shared coordinates $(X_S, Y_S)$ and a depth direction $(Z_S)$ associated with the shared coordinates $(X_S, Y_S)$, the display device displaying a virtual environment having a plurality of objects wherein some objects of the plurality of objects when displayed on the display device are mutually occluded objects or partially occluded objects; determine a set of objects of the plurality of objects having the shared coordinates $(X_S, Y_S)$ and at a location along the depth direction $(Z_S)$; prioritize an object from the set of objects based on at least two of metadata of the set of objects, screen areas of the set of objects, transparency of the set of objects, and opaqueness of at least one object of the set of objects currently displayed to improve the selection of at least one of mutually occluded objects and mutually partially occluded objects in the virtual environment; and associate the prioritized object with the viewer input device for detecting interactions with the prioritized object displayed on the display device by the viewer input device, the prioritized object being updated on the screen of the display device based on the interactions.

A still further object of the embodiments includes a system comprising a display device configured to display a virtual environment having a plurality of objects wherein some objects of the plurality of objects when displayed on the display device are mutually occluded objects or partially occluded objects. The system comprises a processor including: first program instructions which when executed displays the plurality of objects of the virtual environment. The processor includes second program instructions interfaced with the second program instructions, wherein execution of the second program instructions causes the processor to: detect a point location of viewer selection by a viewer input device within a screen of a display device to determine shared coordinates $(X_S, Y_S)$ and a depth direction $(Z_S)$ associated with the shared coordinates $(X_S, Y_S)$; determine a set of objects of the plurality of objects having the shared coordinates $(X_S, Y_S)$ and at a location along the depth direction $(Z_S)$; prioritize an object from the set of objects based on at least two of metadata of the set of objects, screen areas of the set of objects, transparency of the set of objects, and opaqueness of at least one object of the set of objects currently displayed to improve the selection of at least one of mutually occluded objects and mutually partially occluded objects in the virtual environment; and associate the prioritized object with the viewer input device for detecting interactions with the prioritized object displayed on the display device by the viewer input device, the prioritized object being updated on the screen of the display device based on the interactions.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 6C illustrates a pictorial arrangement of the fourth set of mutually occluding objects of FIGS. 6A and 6B;

FIGS. 6D-6H illustrate possible size variations of two objects of the fourth set of mutually occluding objects of FIG. 6C;

DETAILED DESCRIPTION

Figure 1A:
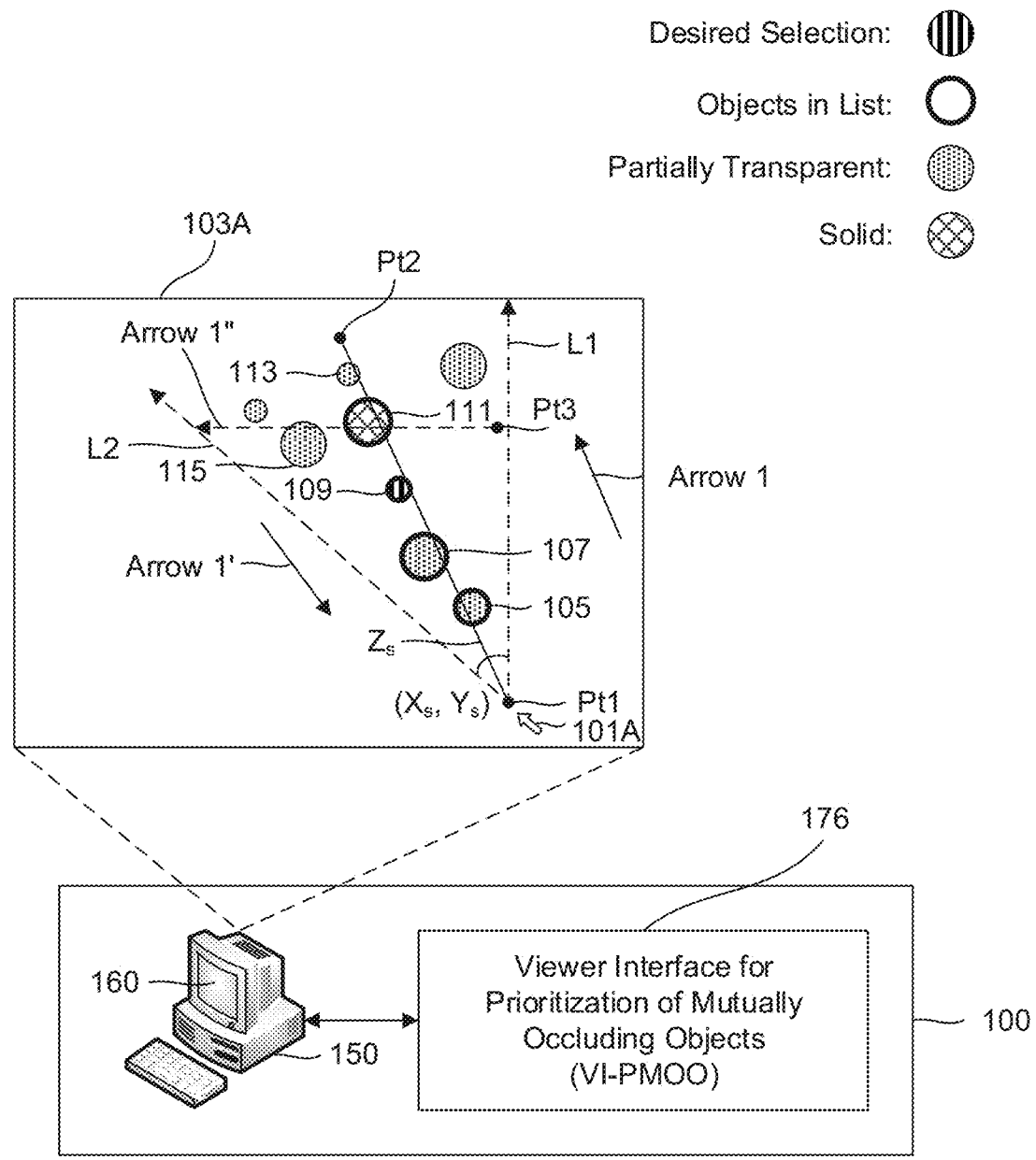
FIG. 1A illustrates a system for prioritized selection of mutually occluding objects in a virtual environment with the occluding objects having at least one solid object along a depth direction.

Embodiments are described herein with reference to the attached figures. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

In previous solutions the viewer would constantly have to adjust the view and/or cursor position to select the item that is desired on mechanically complex components because of occlusion. In the inventors' embodiments, objects are prioritized under the cursor wherein a certain object, such as an occluded or partially occluded object, is automatically prioritized and associated with the cursor. In addition, the embodiments herein allow for selection of objects through other objects such as, without limitation, selection of objects inside a transparent shell.

The embodiments herein are directed to a system for prioritized selection of graphically-displayed objects (GDOs) to improve the viewer-interface of a computing system when interfacing in a virtual environment or other applications with mutually occluding or partially occluding objects executed by the computing system. The viewer-interface for prioritizing mutually occluding objects (VI-PMOO) is configured to minimize the number of clicks needed to associate the cursor to highlight, view and/or interact with an occluded graphically-displayed object on a display device. The objects may include mutually occluding objects. The objects may be partially transparent objects. The objects may be displayed in a virtual environment as solid objects. A set of objects may include at least one partially transparent object and at least one solid object. The viewer-interface as disclosed herein is a user-interface for use by a user/viewer selecting displayed two-dimensional or three-dimensional objects while interacting with a virtual environment or other computing environment using a mouse, pen, keyboard, touch, etc.

The embodiments herein are directed to a system for prioritized selection of GDOs to improve the viewer-interface of a computing system when training in a virtual training environment wherein the VI-PMOO is a smart GDO selector which uses at least one of object metadata, learned object viewer preferences, location information of the viewer relative to the object, object application data and context data to select and object such as from a set of objects which share coordinates along a depth direction and may be occluded or partially occluded.

The embodiments herein allow objects in a virtual environment to be interacted with by the viewer using the VI-PMOO wherein those objects may mutually occlude other objects that share coordinates along a depth direction and/or may be partially transparent. The embodiments use the projected screen area of the objects to automatically prioritize selection rather than solely relying on the cursor, ray, cone, selection area, etc.

FIG. 1A illustrates a system 100 for prioritized selection of mutually occluding objects in a virtual environment 103A with the occluding objects having at least one solid object along a shared depth direction $Z_S$. The system 100 includes a computing device 150 having a viewer-interface for prioritization of mutually occluding objects (VI-PMOO) 176. The VI-PMOO 176 is configured to improve the selection of an object being occluded or partially occluded including when at least one object is solid (opaque).

The objects of the virtual environment 103A are shown in two-dimensions (2D), but may be three-dimensional (3D) objects. The 3D objects may be virtual 3D models. The virtual environment 103A is displayed on display device 160 and includes a plurality of objects arranged in the virtual environment 103A and an object is selectable by the VI-PMOO 176 when a cursor 101A is above the object. The VI-PMOO 176 is configured to prioritize a particular one of underlying objects below the cursor 101A sharing the shared set of coordinates $X_S$, $Y_S$ along the shared depth direction $Z_S$ at point Pt1. Because, the objects may be 3D, the shared set of coordinates $X_S$, $Y_S$ along the shared depth direction $Z_S$ may vary based on the current perspective displayed on the projected view displayed, location of the viewer relative to the object or the perspective relative to the eye gaze of the viewer. Assume that a ray is cast (hereinafter referred to as "ray cast") from a point detected of a cursor or touch point, for example. However, in the drawings, while multiple points are described, only one ray cast is shown from one of the points. In FIG. 1A, the key is established for the objects relative to the illustrated ray cast relative to point Pt1 in the direction of arrow ARROW 1.

In the virtual environment 103A, objects 105, 107, 109, 111 and 113 are shown to have the shared set of coordinates $X_S$, $Y_S$ along the shared depth direction $Z_S$ within the ray cast defined by angled lines L1 and L2, sharing point Pt1. The objects 105, 107, 109, 111 and 113 will sometimes be referred to as a set of objects at point Pt1. The arrow, denoted as ARROW 1, is shown directed along a path which begins with object 105 and passes through in series objects 107, 109, 111 and 113. Thus, assume that the viewer's eyes will see object 105 immediately below cursor 101A with all remaining objects of the set of objects being occluded or partially occluded below the object 105 of the set from the perspective of point Pt1. An occluded object is an object with a screen area which cannot be seen from at least one solid object above the occluded object. A partially occluded object may be a transparent object which can be seen below other transparent objects regardless of the size of the screen area. A partially occluded object may be a solid object which can be seen below other transparent objects. A partially occluded object may be a solid object which has a portion of the screen area visible below other small solid objects or offset solid objects. From the perspective of point Pt1, object 105 is not occluded or partially occluded. As will be seen from the description of FIGS. 2A-2C, occluded object 109 may be selected by the VI-PMOO 176.

Assume now that the cursor has been moved to point Pt2. Then, the ray cast would change from point Pt1 to that of Pt2, but is not shown. The arrow, denoted as ARROW 1', is shown directed along a path which begins at point Pt2 with object 113 being the first object and passes through in series objects 111, 109, 107 and 105 of the set of objects related to point Pt2. Thus, assume that the viewer's eyes will see object 113 first with all remaining objects in the set of objects of point Pt2 below the object 113 being occluded or partially occluded by one or more objects of the set. Of the set of objects, object 111 is a solid object and objects 105, 107 and 113 are transparent. The object 109 may be solid or transparent for discussion purposes later in relation to FIGS. 2A and 2B. From the perspective of point Pt2, object 113 is not occluded. As will be seen from the description of FIGS. 2A-2C, occluded object 113 may be selected by the VI-PMOO 176.

Assume that the cursor 101A has been moved to point Pt3 with the perspective of the objects and ray cast (not shown from point Pt3) changed relative to the screen. The arrow, denoted as ARROW 1", is shown directed along a path which begins at point Pt3 with object 111 being the first object and passes through to object 115. Thus, assume that the viewer's eyes will see object 111 first with all remaining objects below the object 111 being occluded or partially occluded. Objects 111 and 115 are a set of objects relative to point Pt3. As can be seen in FIG. 1A, object 111 is not occluded from the perspective of point Pt3 and object 115 may be partially occluded. As will be seen from the description of FIGS. 2A-2C, object 111 may be selected by the VI-PMOO 176 if the cursor is moved to a location on the screen area of object 111 which is not shared with object 115 or any other object. On the other hand, occluded object 115 may be selected by the VI-PMOO 176 if the cursor is moved to a location on the screen area of object 115 which is not shared with object 111 or any other object. In some instances, if it is determined that object 111 is solid, then object 111 would be the only object in the candidate objects list if the cursor is clicked at the point Pt3, for example.

As can be seen in FIG. 1A, from the perspective of point Pt3, the objects 105, 107, 109 and 111 are not occluded when viewing in the direction of ARROW 1". Object 113 is occluded or partially occluded.

The distance between objects is for illustrative purposes. Some objects may be nested inside other objects as will be discussed later in relation to FIGS. 3A-3D or in direct contact as shown in FIG. 6C, for example.

Figure 1B:
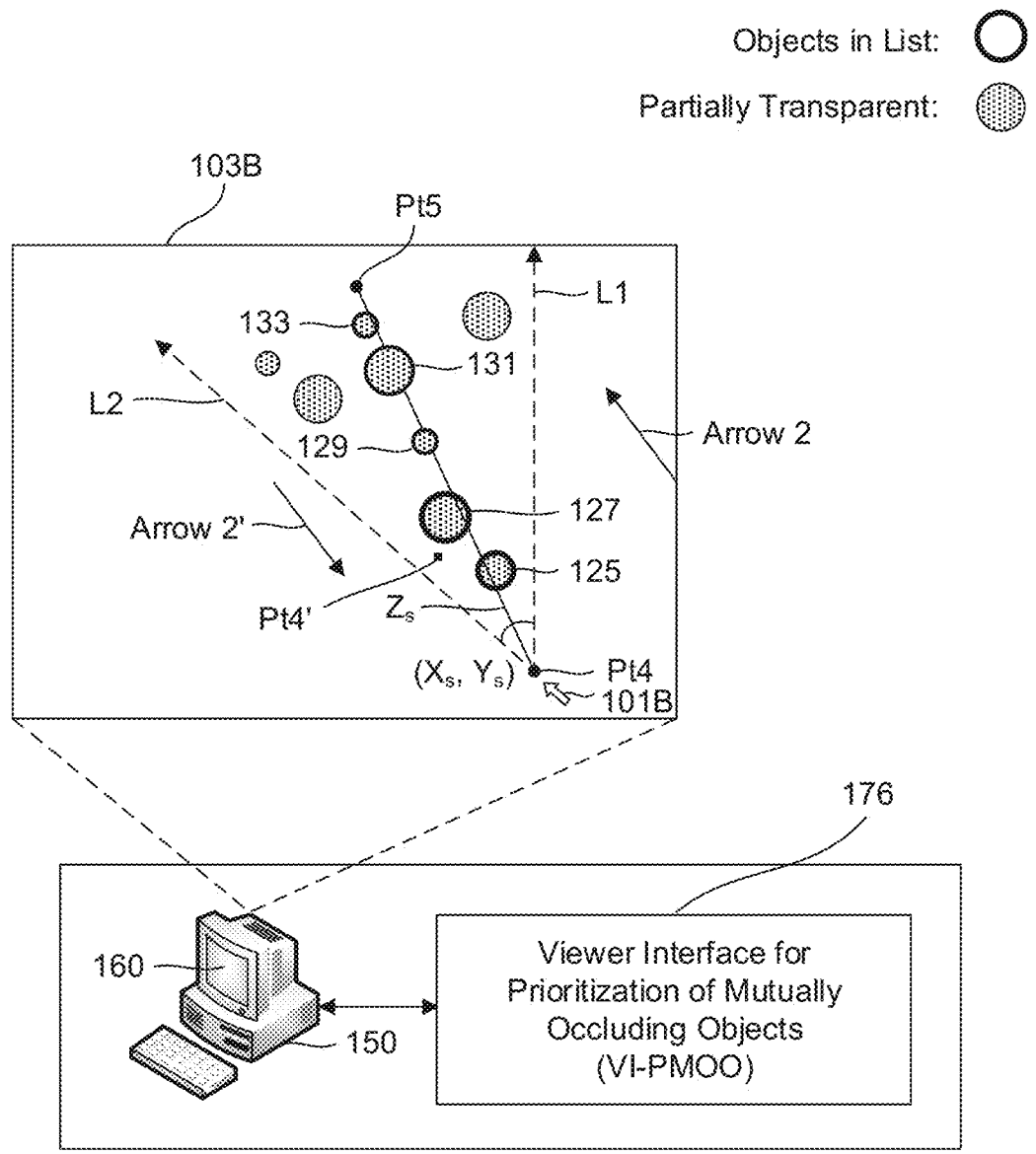
FIG. 1B illustrates a system for prioritized selection of mutually occluding objects in a virtual environment with the occluding objects having all transparent object along a depth direction.

FIG. 1B illustrates a system 100 for prioritized selection of mutually occluding objects in a virtual environment 103B with the occluding objects having all transparent object along a shared depth direction $Z_S$. The system 100 includes a computing device 150 having a VI-PMOO 176 for prioritization of mutually occluding objects. The VI-PMOO 176 is configured to improve the selection of an object being occluded or partially occluded with the minimum number of clicks and/or the least amount of movement of the cursor to interact with an occluded or partially occluded object. In FIG. 1B, the key is established for the objects relative to the illustrated ray cast relative to point Pt4 in the direction of arrow ARROW 2.

The objects are shown in two-dimensions (2D), but may be three-dimensional (3D) objects. The virtual environment 103B is displayed on display device 160 and includes a plurality of objects arranged in the virtual environment 103B and an object is selectable by the VI-PMOO 176 when a cursor 101B is above the object or within a ray cast. The VI-PMOO 176 is configured to prioritize a particular one of underlying objects below the cursor 101B sharing the shared set of coordinates $X_S$, $Y_S$ along the shared depth direction $Z_S$. Because the objects may be 3D, the shared set of coordinates $X_S$, $Y_S$ along the shared depth direction $Z_S$ may vary based on the current perspective displayed on the projected view displayed or the perspective relative to the eye gaze of the viewer. The language "below the cursor" also may refer to objects which are closest to the viewer.

In the virtual environment 103B, objects 125, 127, 129, 131 and 133 are shown to have the shared set of coordinates $X_S$, $Y_S$ along the shared depth direction $Z_S$. The objects 125, 127, 129, 131 and 133 will sometimes be referred to as a set of objects at point Pt4. The arrow, denoted as ARROW 2, is shown directed along a path which begins with object 125 and passes through in series objects 127, 129, 131 and 133. Thus, assume that the viewer's eyes will see object 125 immediately below cursor 101B with all remaining objects of the set of objects from point Pt4 being partially occluded below the object 125 of the set within the ray cast. Of the set of objects from point Pt4, all objects 125, 127, 129, 131 and 133 are transparent. Moving the cursor and/or clicking just to the left of object 125 such that the point Pt4' is to the left of object 125 removes objects 125 and 129, and possibly 133 from the list since their bodies do not share new point Pt4'.

In the virtual environment 103B, the arrow, denoted as ARROW 2', is shown directed along a path which begins with object 133 and passes through in series objects 131, 129, 127 and 125. Thus, assume that the viewer's eyes will see object 133 immediately below cursor 101B with all remaining objects of the set of objects from point Pt5 being occluded or partially occluded below the object 125 of the set. Of the set of objects from point Pt5, all objects 125, 127, 129, 131 and 133 are transparent.

Thus, as can be seen from the description of FIGS. 1A and 1B, as the objects' perspective or location is changed on the screen relative to the point of the cursor or location of the viewer, the order and listing of objects will vary. In some embodiments, as the viewer interacts and moves relative to the virtual environment 103A or 103B, the objects' perspective or location may be changed relative to the viewer. Virtual environments 103A and 103B may be part of the same virtual environment, but at different area, compartment, building, zone, room, etc., in the virtual environment.

Figure 2A:
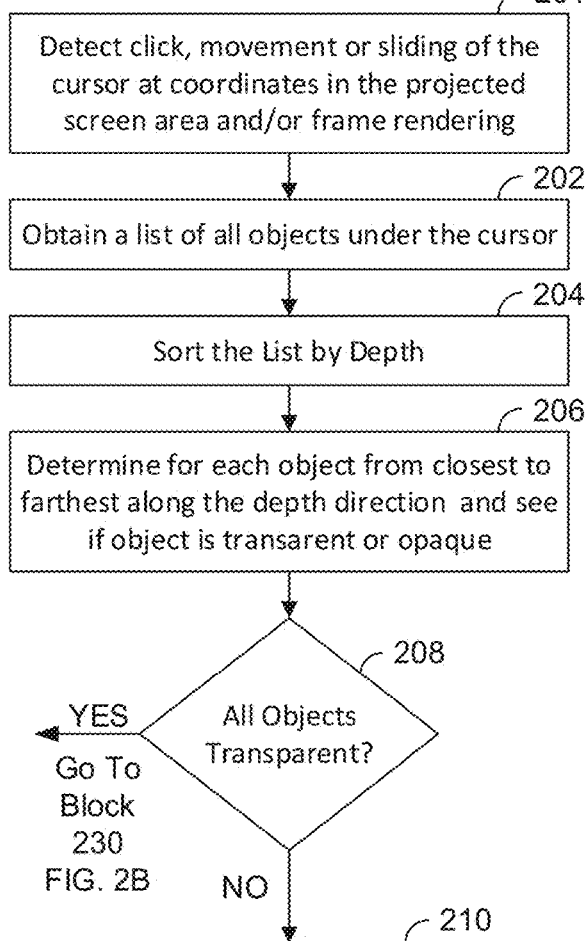
FIGS. 2A and 2B illustrate a flowchart of a method for prioritized selection of mutually occluding objects in a virtual environment.
Figure 2B:
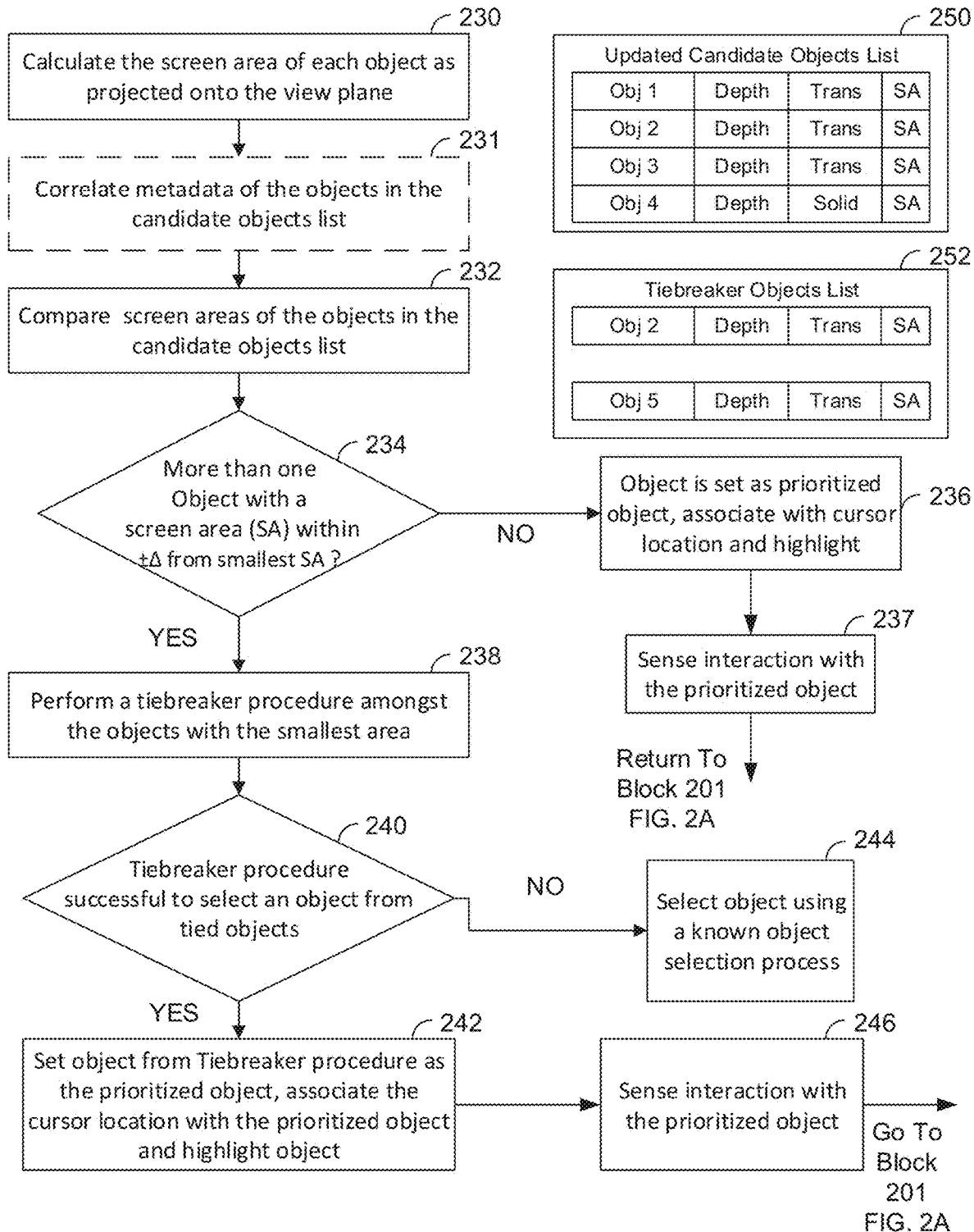

FIGS. 2A and 2B illustrate a flowchart of a method 200 for prioritized selection of mutually occluding objects in a virtual environment. The blocks of the method 200 may be performed in the order shown or a different order. The method 200 may include additional blocks or blocks may be deleted. One or more of the blocks of the method may be performed contemporaneously. The description of FIGS. 2A and 2B will be described in relation to FIGS. 1A and 1B. The method 200 may include, at block 201, detecting a click, movement of the cursor to a set of coordinates $X_S$, $Y_S$ associated with a particular point on the current screen area. In some embodiments, the detection for a location of a cursor may be triggered by frame rendering.

The method 200 may include, at block 202, obtaining a list of all objects at the coordinates $X_S$, $Y_S$ along the depth direction $Z_S$ as shown in FIGS. 1A and 1B in the direction of arrow ARROW 1 or ARROW 2, respectively, for example. In other words, an objects list 222 of all objects from the virtual environment 103A or 103B under the cursor 101A or 101B or other viewer selector input device. By way of non-limiting example, the objects list 222 may include the object name or number and the corresponding depth of each object. The method 200 may include, at block 204, sorting the objects list 222 by depth in the depth direction (Z) to develop a sorted objects list 224. In this example, the order in the objects list 222 is the same as the sorted objects list 224, but these lists may have a different order of objects relative to each other. The method 200 may include, at block 206, determining, for each object from the closest relative to the viewer's view or cursor to the farthest along the depth direction $Z_S$, which objects are partially transparent (trans) and which objects are opaque (solid). At block 206, the type of surface of the object may be added to form a type of surface/objects list 226. This list 226 may be the objects list 222 updated with the type of surface. In some embodiments, the objects list 222 when originally formed may already include the surface type data and/or metadata.

At block 208, a determination is made whether all objects are transparent (trans). If the determination at block 208 is "YES," the method 200 may jump to block 230 in FIG. 2B. If all of the objects are partially transparent, the type of surface/objects list 226 becomes the candidate list. When determining which objects are transparent and which are solid, the VI-PMOO 176 may read object pixel data for the displayed screen area by the virtual environment. Furthermore, the candidate list may include only one solid object. The solid object may be selected as the first solid object closest to the viewer in the objects list.

If the determination, at block 208, is "NO," then the method 200 may proceed to block 210. At block 210, all objects up to and including the first opaque object in list 226 are maintained in the list and the remaining objects are discarded to create a candidate objects list 228. In reference again to FIG. 1A, assume that there are five (5) objects with the first object (i.e., object 105) of the five being partially transparent and the object 111 is solid. The term solid and opaque are synonymous. Then, the first object (i.e., object 105) up to the first solid object (i.e., object 111) remains in the candidate list 228 and all others discarded. In this example, object 133 would be discarded. In the example of FIG. 1A, the first object (i.e., object 105) is at the closest depth to the viewer along the depth direction $Z_S$ in the direction of arrow ARROW 1. The first object (i.e., object 105) also being at the shallowest depth along the depth direction $Z_S$ in the direction of arrow ARROW 1.

By way of non-limiting example, if the viewer wishes to interact with an object other than 109, the viewer would need to modify the ray cast (i.e., move the mouse and cursor), such that the ray no longer intersects 109. This will cause 109 to be removed from the candidate list, and then the new smallest object in the candidate list would be selected, or a tiebreaker used to determine the selection. If the viewer's desired object still cannot be selected, then the viewer may need to fall back to another known selection method. But selecting another object may be as simple as moving the viewer's perspective such as moving the cursor to point Pt2 and repeating the process 200, for example. From the perspective of point Pt2, the viewer can see the larger surface area of object 111 relative to object 113. Thus, object 111 can be selected by placing the cursor over object 111 in a way which may not intersect with other objects so that a single click may be used to select the object 111. Using a single click, for example, object 113 may be selected if the cursor is over 113, since object 111 is larger and thus has additional screen surface area from which object 111 can be selected by the viewer.

Considering the candidate objects list 228 as observed from the depth direction of ARROW 1' (FIG. 1A), object 113 becomes the first object and object 111 being the first solid object. The objects up to the first solid object includes objects 111 and 113. Thus, the candidate objects list 228 would include objects 111 and 113, by way of non-limiting example.

The method 200 may include, at block 212, determining if there is only one object in the list. If the determination is "YES," the one object is selected and set as the prioritized object, at block 214, the cursor is associated with the prioritized object and highlighted. The method 200 may include, at block 216, sensing an interaction by the viewer of the prioritized object with the cursor. The VI-PMOO 176 may, upon sensing an interaction by the viewer, such as in response to selection of the 3D object or other interaction parameters defined by the virtual environment, communicate the sensed interaction to the virtual environment. Thus, the virtual environment can, in response, update the 3D model or the frame of the virtual environment on the screen of the display device based on the received sensed interaction from the VI-PMOO 176. The method 200 may return to block 201 and a subsequent prioritized object may be determined for the new location. For example, once a new object is introduced into the list, the method 200 may select a new prioritized object using the procedure of blocks 201-212. If the location changes and objects are removed from the objects list, a prioritized object may be determined from the new objects list. In some embodiments, once the state (metadata) of the prioritized object changes, a new prioritized object may be selected based on the viewer's interaction in the virtual environment.

Returning to block 212, if the determination is "NO," then the method 200 may proceed to block 230 of FIG. 2B. The candidate list from block 208 or block 212 is processed by block 230.

At block 230, the method 200 may calculate a screen area (SA) for each object in the candidate objects list and may be updated with the screen area to form an updated candidate objects list 250. When determining the screen, the object's surface dimensions and related pixel data for such dimensions may be retrieved and read by the VI-PMOO 176. The method 200, at block 231, may include correlating the metadata of the objects in the candidate objects list 250. The method 200, at block 232, may include comparing the calculated screen area of each object remaining in the updated candidate list 250. In some embodiments, the objects may be ranked in descending order, for example, in the candidate list 250 with the object with the smallest screen area being first in the list. The screen area (SA) of any one object associated with any set of coordinates $X_S$, $Y_S$ may vary based on the object's perspective relative to the coordinates, as will be described in more detail in relation with FIGS. 3A-3D.

The method 200 may include, at block 234, determining if more than one object has a smallest screen area within a set tolerance $\pm \Delta$ with respect to another object. The tolerance may be selected by an administrator, programmer or viewer. If the determination at block 234 is "NO," meaning only one object has a significantly smaller screen area than the others. The one object is selected and set as the prioritized object, at block 236, and the cursor is associated with the prioritized object and highlighted, for example. The perimeter, line or other surface of the prioritized object may be highlighted so that the viewer is apprised of which object is selected for further interaction. The term "highlighted" may include changing or brightening a perimeter, line or surface with a brighter or darker color. The term "highlighted" may include changing at least one parameter of at least one line of a perimeter, line or surface. The at least one parameter may include line changes and/or surface changes, by way of non-limiting example. At block 237, interaction by the viewer may be detected or sensed to apprise the virtual environment of the viewer's interaction for the object for frame rendering update, for example. The method 200 may return to block 201 (FIG. 2A). With respect to FIG. 1A, depending on the perspective of the objects relative to point Pt1, point Pt2 or point Pt3, by way of example, the arrangement of the objects may appear differently on the screen or relative to the viewer and the objects in the list would be varied. Likewise, depending on the perspective of the objects relative to points Pt4, Pt4' and Pt5 will vary the objects in the list.

With respect to FIG. 1B, if the objects in the candidate list are all partially transparent, such as from block 208, the viewer when interacting with the objects may intuitively observe that the partially transparent objects are selected based on the smallest screen area along a depth direction $Z_S$ for coordinates $X_S$, $Y_S$ for which the cursor was moved to or clicked. In general, the viewer may visually see the mutually occluding objects along a depth direction $Z_S$ for coordinates $X_S$, $Y_S$ and their boundaries, as will be described in relation to FIGS. 5A-5C. The prioritized object is highlighted and allowed to be interacted with by clicking the cursor to select a permissible interaction. In some embodiments, clicking a currently prioritized object in the virtual environment may provide a default interaction with the object, such as to cause the virtual environment to automatically change some object parameter. An object parameter may include size, shading, location, etc. With respect to FIG. 1B, depending on the perspective of the objects relative to point Pt4, Pt4', or point Pt5, the arrangement of the objects may appear differently on the screen or relative to the viewer.

In some instances, at least two objects may have the smallest screen areas which are equal or within the tolerance $\pm \Delta$. These objects are tied objects. Thus, if the determination at block 234 is "YES," then at least two objects from the updated candidate objects list 250 with equal screen areas or screen areas within the tolerance $\pm \Delta$ are populated in a tiebreaker objects list 252. In relation to the example of FIG. 1A, object 109 would be selected as the object with the smallest screen area in the candidate objects list. As can be seen from FIG. 1B, objects 129 and 133 may have screen areas which are within the tolerance $\pm \Delta$. The method 200 performs a tiebreaker procedure on the tied objects, as will be described in relation to FIG. 2C. The method 200 may include, at block 240, a determination whether the tiebreaker procedure was successful, meaning one object was selected. If the determination at block 240 is "NO," the viewer may be prompted, at block 244, to select a respective one object selector in Table 1 below. The tiebreaker procedure 260 (FIG. 2C) may return a flag or other indicator of success or unsuccessful tiebreaker. On the other hand, if the determination at block 240 is "YES," then the object from the tiebreaker procedure may be set as the prioritized object and the cursor is associated with the prioritized object for further interaction by the viewer, at block 242. The method 200, at block 246, may detect interaction by the viewer with the prioritized object. The method 200 may loop back to block 201 (FIG. 2A) as the viewer interacts within the virtual environment 103A or 103B, for example. As can be appreciated, as the viewer interacts with the prioritized object, the virtual environment may update the displayed prioritized object. Once a new prioritized object is detected, the virtual environment may suspend updating the displayed prioritized object such that the suspended object maintains its current perspective and/or state, in some non-limiting examples. In another example, the suspended object may be removed from the currently projected screen area of the virtual environment. In other examples, the suspended object may be returned to its original or default location, size and perspective relate to the virtual environment. In a non-limiting example, updating the suspended object may be a function of metadata of the object such as the state of the object. For example, if the required activities of suspended object have been complete, the suspended object may be moved to a different portion of the screen area.

The tiebreaker procedure 260 will be described in relation to FIG. 2C. The method 200 may include, at block 224, determining whether the tiebreaker procedure was successful to select an object from the tied objects.

Figure 2C:
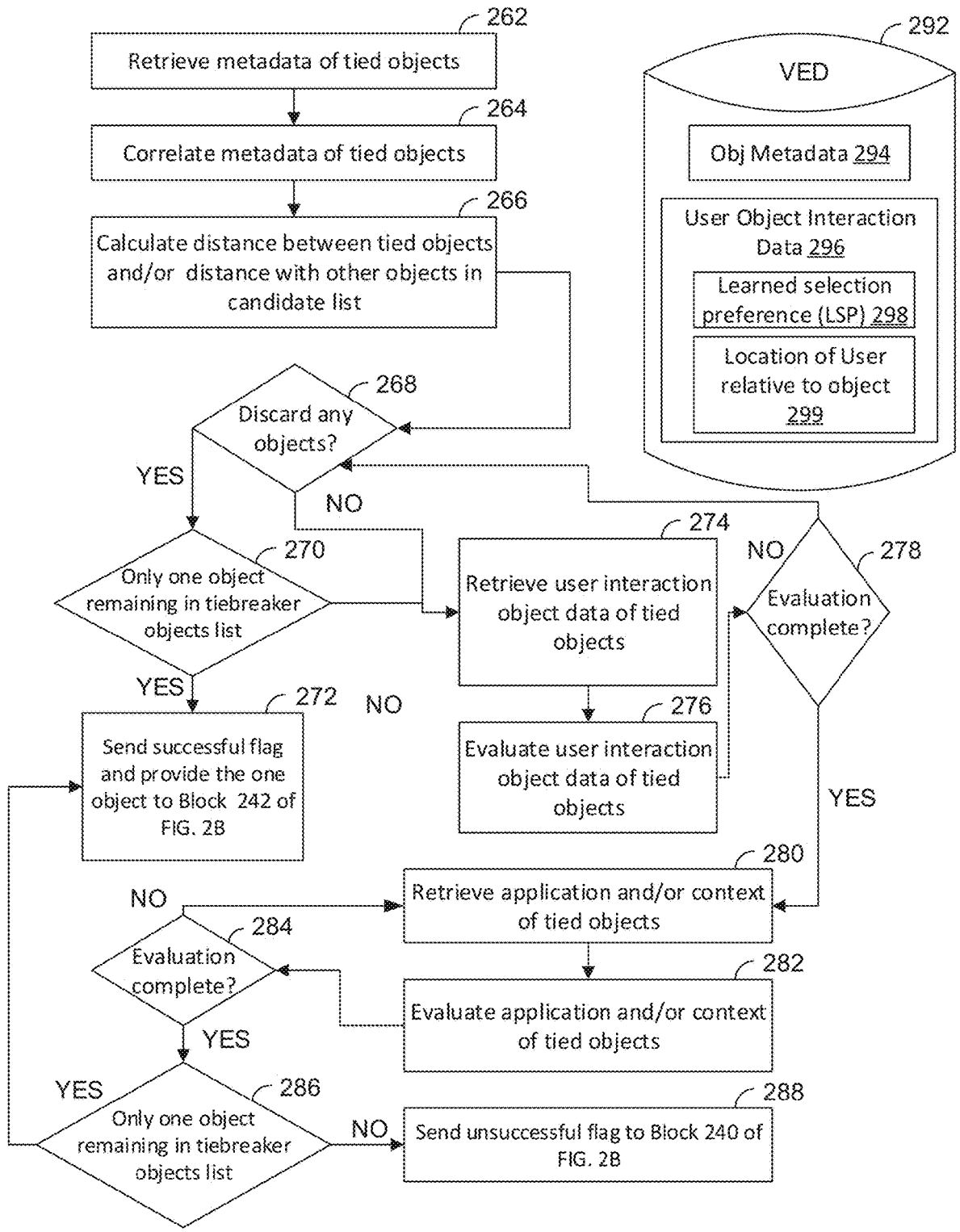
FIG. 2C illustrates a flowchart of a tiebreaker procedure for use in the method of FIGS. 2A and 2B.

FIG. 2C illustrates a flowchart of a tiebreaker procedure 260 for use in the method 200 of FIGS. 2A and 2B. The tiebreaker procedure 260 may include, at block 262, retrieving metadata 294 for each of the tied objects from the virtual environment database (VED) 292. In some embodiments, the metadata 294 may be populated in the tiebreaker objects list 252. The object metadata 294 may include one or more of the object type, object class, object state, object distance, shader attributes and texture, for example, as described in FIG. 7. In some instances, an object may share coordinates $X_S$, $Y_S$ of objects in a candidate list along a depth direction $Z_S$, but is a distant object from other objects in the tiebreaker objects list. For example, during a task in a virtual environment 103A or 103B, certain objects may be of a particular class or tied to a particular assembly while a distant object is not part of the class or assembly. Thus, the distant object may be removed from a tiebreaker objects list 252.

Object metadata can be used to form a prioritization heuristic or used as individual data points. Some examples may include prioritizing less transparent objects over more transparent ones, prioritizing based on color, and/or utilizing a developer-provided bias. In a parts assembly application, for example, the object type (fastener, bolt, assembly, etc.) and a developer-provided bias may be used for prioritizing objects in the candidate objects list or the tiebreaker objects list.

The tiebreaker procedure 260 may include, at block 264, correlating metadata of objects in the tiebreaker objects list 252. Based on the correlating of the metadata, a particular one of the objects may have a higher priority for interaction before others in the list. The tiebreaker procedure 260 may include, at block 266, calculating a distance between objects in the tiebreaker objects list 252 or a distance relative to the shared coordinates $X_S$, $Y_S$. The tiebreaker procedure 260 may include, at block 268, determining if any objects can be discarded from the tiebreaker objects list 252. If the determination is "YES," the object(s) is discarded and, at block 270, if the determination is that only one object is in the tiebreaker list, the one object is set as the prioritized object and highlighted for viewer interaction, at block 272. Otherwise, if the determination, at block 270 is "NO," the procedure 260 may proceed to block 274. At block 268, if the determination is "NO," the procedure 260 may proceed to block 274.

At block 274, the procedure 260 may include retrieving viewer interaction object data from viewer interaction database 296. The procedure 260 may include, at block 276, evaluating the viewer interaction object data of the tied objects. The viewer interaction object data may include a learned selection preference 298 and location 299 of the viewer relative to the displayed object or current perspective of the object in the virtual environment as described in relation to FIGS. 4A-4B or as described in relation to FIGS. 6C-6F. For example, learned selection preference 298 may be based on prior interactions of the viewer with a set of occluding objects or past interactions with the current virtual environment or other virtual environments. For example, in a training virtual environment, the learned selection preference 298 may be based on the last object being interacted with in the training exercise. If the training exercise was completed with the object, the next object in the set of occluding objects may be offered to the viewer and selected as the prioritized object.

In another example, if the set of occluding objects is linked together which a preferred order of interaction based on object types, the occluding objects may be selected based on the preferred order to select an object of the set of objects as the prioritized object.

Viewer object interaction data 296 can be utilized (with other metadata) to form a priority heuristic to assist in the tiebreaker decision process. The learned selection preference (LSP) 298 may be determined through machine learning algorithms. By way of non-limiting example, the machine learning protocols may determine whether or not the object selected through this method was the object the viewer intended to select. The machine learning algorithms may track interactions performed by the viewer in a similar context, state, perspective, etc. Additionally, the machine learning algorithms may determine data related to whether the viewer actually chose to perform an action on this selection. The results of the machine learning algorithms would be stored in memory as the LSP 298. The stored LSP 298 would be used in a machine learning algorithm for later application when a viewer is in the same or similar state, for example. The LSP 298 may provide an auto-complete to object selection to prioritize objects in the tiebreaker objects list based on past interactions of the viewer.

By way of non-limiting example, assume that 100 viewers, while in some state S in a virtual environment, have each caused, through interaction with the virtual environment, a candidate list consisting of similarly-sized objects M and N. When object M was prioritized by the method, 22% of the cases resulted in continued interaction by the viewer. When object N was prioritized, 76% resulted in a continued interaction. Thus, the machine learning of the learned selection preference 298 can be used to add a higher prioritization to object N over object M, for example. The more interactions recorded, the more accurate the machine learning algorithms can be used to determine which object has a higher priority. In the case where the machine learning algorithm's prioritization or selection is wrong, the viewer can revert to a previously known method of selection.

The procedure 260 may include, at block 278, determining if the evaluation is complete from block 276. If the determination at block 278 is "NO," the procedure 260 may loop back to blocks 268, 270, 272 and/or 274 to determine if any objects can be discarded and if only one object is in the tiebreaker objects list. At block 274, the VI-PMOO 176 may first evaluate the learned selection preference 298 and in the subsequent loop, retrieve and evaluate the location of the viewer relative to the object 299. Alternately, the location of the viewer relative to the object 299 may be evaluated prior to the learned selection preference 298, for example. The evaluations, at block 276, may not be complete until all evaluations loop through blocks 268, 270 and 272 to see if objects can be discarded and if only one objects remains in the tiebreaker list. If the determination at block 278 is "YES," then the procedure 260 may proceed to block 280.

At block 280, the procedure 260 may retrieve application data and/or context data of the tied objects in the tiebreaker objects list if more than one object remains. The embodiments may use metadata about all of the objects under the cursor and context sensitivity to further improve selection accuracy as will be described in more detail later. For example, after block 230, metadata, application data and/or context data may be used for selecting an object in a candidate objects list. The procedure 260 may include, at block 282, evaluating application data and/or context data of the tied objects. The procedure 260 may include, at block 284, determining if the evaluations associated with application data or context data is complete. At block 284, if the determination is "NO," additional data is retrieved at block 280 and further evaluated at block 282. For example, the VI-PMOO 176 may first retrieve context data for evaluation before application data. Likewise, the VI-PMOO 176 may retrieve the application data for evaluation prior to the context data.

At block 284, if the determination is "YES," a determination is made whether only one object remains in the tiebreaker objects list, at block 286. If the determination is "NO," a flag or indicator is sent to block 240 of FIG. 2B to indicate that the tiebreaker procedure 260 was unsuccessful.

If the determination is "YES," block 286 loops back to 272 where a successful flag or indicator is sent to block 242 and the only one object remaining in the tiebreaker objects list.

As will be described in relation to FIGS. 4A and 4B, if two objects are associated together (such as a washer and bolt head) and which have areas close to each other, the bolt head would need to be interacted with first before the washer can be accessed. Thus, some tied objects may be ordered within an assembly to break a tie. At block 278, the procedure may determine an order or object rank based on the application and/or context of objects remaining in the tiebreaker objects list. The object with the highest rank or priority may be selected.

The VI-PMOO 176 (FIGS. 1A and 1B) will be described in more detail below using a variety of examples addressing different scenarios. As can be appreciated, describing each and every scenario herein is prohibitive.

Example 1

Example 1 will be described in relation to the views of FIGS. 3A-3D. Example 1 is illustrative of the VI-PMOO 176 (FIGS. 1A and 1B) performing a prioritization selection of an object in a set of objects with at least one solid object.

Figure 3A:
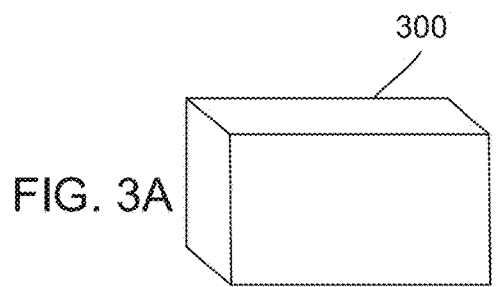
FIG. 3A illustrates a first object of a first set of three-dimensional (3D) solid occluding objects.

FIG. 3A illustrates a first object 300 of a first set of three-dimensional (3D) solid occluding objects. The first object is solid, thus the viewer from this perspective cannot see any other occluding/occluded objects of the first set of 3D occluding objects. Assume now that the viewer moves a cursor 301B over the first object 300 and specifically over surface or wall 302 of the first object 300.

Figure 3B:
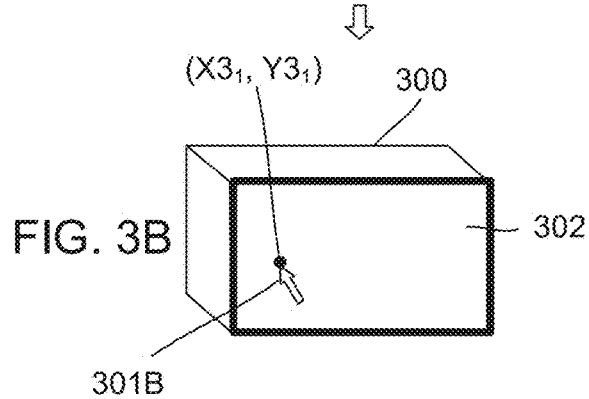
FIG. 3B illustrates the viewer-interface selecting a first object of the first set of 3D solid occluding objects.

FIG. 3B illustrates the VI-PMOO 176 selecting the first object 300 of the first set of 3D solid occluding objects. In this non-limiting example, a cursor 301B is shown. The cursor 301B is shown placed over the first object 300. Assume, cursor 301B is located at coordinates $X3_1$, $Y3_1$. Because the first object 300 is the largest with the largest screen area based on this perspective and assume no other objects of the set of 3D solid occluding objects intersect along the depth direction for coordinates $X3_1$, $Y3_1$. Thus, the first object 300 being solid would be the only object in the candidate objects list. The cursor 301B is then associated with the first object 300 for further interaction and is shown highlighted around its perimeter. The highlighted perimeter denotes the current selected or prioritized object.

The prioritization or selection of the first object 300 by the viewer-interface is activated either by a single click of the cursor 301B at coordinates $X3_1$, $Y3_1$, moving or sliding the cursor 301B to the coordinates $X3_1$, $Y3_1$. By way of non-limiting example, a frame update or a rendered frame may trigger method 200 (with no mouse/cursor movement required). Nonetheless, clicking, moving or sliding the cursor 301B anywhere in the area of the first object 300 allows the first object 300 to remain selected. The first object 300 may always be selected regardless of any subsequent clicks. By way of non-limiting example, the viewer is able to interact with the first object with the cursor 301B through at least one click, movement or sliding of the cursor to a location on the screen. As can be seen from FIGS. 3A- and 3B, object 300 is a rectangular hollow box. Thus, some sides of the rectangular hollow box have a smaller screen area than the current screen area shown, if viewed by the viewer from a different perspective.

The viewer may be provided a list of possible or permissible interaction actions as per the application of the virtual environment selectable by the viewer or to advance navigation through the virtual environment. In other applications, the viewer may interact with the virtual environment through tool bars, drop-down lists, etc. In this example, assume the viewer/view has selected to remove wall 302. By removing the wall, by way of non-limiting example, the virtual environment would render the wall 302 transparent or partially transparent.

Figure 3C:
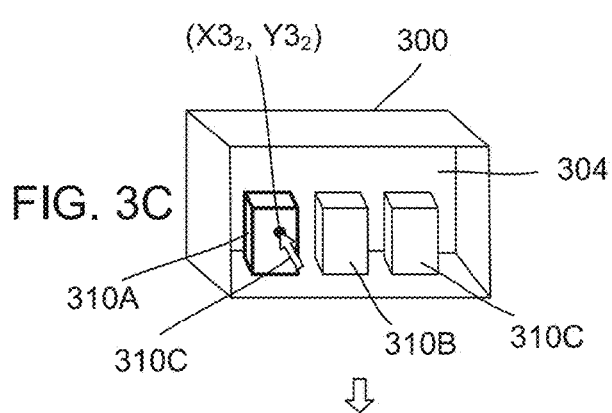
FIG. 3C illustrates the viewer-interface selecting a second object of the first set of 3D solid occluding objects.

FIG. 3C illustrates the VI-PMOO 176 selecting a second object 310A of the first set of 3D solid occluding objects. Assume the viewer maintains the cursor 301C at the same location as in FIG. 3B after the wall 302 has been rendered as transparent or partially transparent. The cursor 301C is shown placed over the second object 310A which just happens to be under the cursor 301C after the wall 302 was made transparent or partially transparent. Assume cursor 301C is located at coordinates $X3_2$, $Y3_2$ which, for the purposes of this discussion, are the same as coordinates $X3_1$, $Y3_1$ since the cursor did not move. The first object 300 may still have a back wall 304 which is opaque or partially transparent. Assume that the back wall 304 is opaque. Then, the candidate objects list would include the first object, for example, at the back wall 304 and the second object 310A up to the cursor location. In this example, assume the back wall 304 is partially transparent, then the candidate list would include the back wall 304 of the first object 300 and the second object 310A. In both instance, because the first object 300 is the largest with the largest screen area and the second object 310A has the smallest screen area at coordinates $X3_2$, $Y3_2$, then the second object 310A may be easily selected as the prioritized object by the viewer.

By way of non-limiting example, the viewer may select the larger object (i.e., the first object 300) and choose to have it removed. For example, the VI-PMOO 176 may provide the viewer with a selection option to remove the larger object (i.e., the first object 300). Once removed, the larger object, if presented as a partially transparent object, might still occlude the second object 310A using a standard, first-collision ray cast. Thus, to prevent this occlusion, the method described herein allows the second object 310A to be prioritized over the partially transparent larger object (but not a fully opaque larger object). In other words, the wall 302 needs to be removed or rendered transparent or partially transparent. Thus, the second object 310A is prioritized for selection and shown highlighted around its perimeter to denote the second object 310A as the currently prioritized object and associated with the cursor 301C. In this depicted example, additional objects 310B and 310C are also shown. The selection of these objects as a currently prioritized object includes moving or clicking the cursor 301C over the displayed screen area of either objects 310B or 310C to interact with the selected one object of objects 310B or 310C once the wall 302 has been removed. Objects 310B and 310C have their own shared coordinates which intersect with the back wall 304.

The prioritization of the second object 310A by the viewer-interface is activated either by a single click of the cursor 301C at coordinates $X3_2$, $Y3_2$, moving or sliding the cursor 301C to the coordinates $X3_2$, $Y3_2$. Frame rendering may initiate method 200 so as to maintain second object 310A as the prioritized object. Nonetheless, clicking, moving or sliding the cursor 301C anywhere in the screen area of the second object 310A with no other objects in the set of solid occluding objects along the corresponding depth direction allows the second object 310A to remain selected. The second object 310A may always be selected regardless of any subsequent clicks provided no other objects intersect along the depth direction at the point of click or the viewer's interaction with the current prioritized object (i.e., second object 310A) has not been completed. By way of non-limiting example, the viewer is able to interact with the second object 310A with the cursor 301C through at least one click, sliding or movement of the cursor to a location on the screen. The viewer may be provided with a list of possible or permissible interactions with the second object 310A from which the viewer may select to advance interaction or navigation through the virtual environment.

Assume the virtual environment is training for maintenance of a vehicle. Assume the first object 300 is the vehicle with a hidden battery, an alternator, a motor, interior front-end chassis, a control panel, spark plugs, etc. Let the first object 300 be a front end of the vehicle and wall 302 serve as a hood of the vehicle. If a viewer clicks or moves the cursor to the hidden battery (i.e., object 310A) occluded under the hood (i.e., wall 302), the hood would be opened to reveal the hidden battery (i.e., object 310A), alternator, motor, front end chassis, control panel, spark plugs, etc., but with the hidden battery being highlighted as result of being selected as the current prioritized object. In this instance, the battery may be selected based on screen area under wall 302. In other embodiments, for example, the wall 302 may be a door into a room or a lid on a device, machine or product.

Assume now that the viewer has moved the cursor.

Figure 3D:
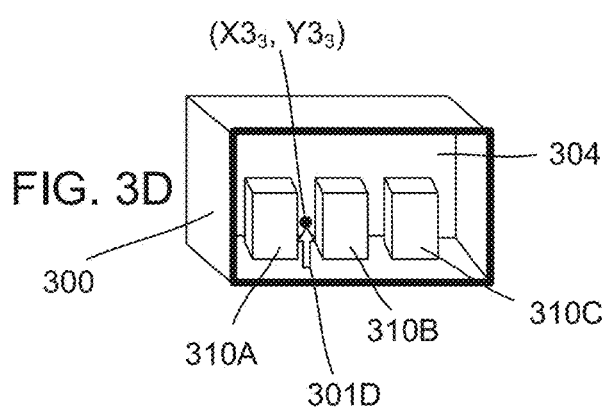
FIG. 3D illustrates the viewer-interface re-selecting the first object of the first set of 3D solid occluding objects.

FIG. 3D illustrates the VI-PMOO 176 automatically re-selecting the first object 300 of the first set of 3D solid occluding objects wherein the perimeter of the first object 300 is automatically re-highlighted. Since the cursor 301C was moved to a new location, denoted as cursor 301D, the cursor 301D is now over the back wall 304 of the first object 300. The candidate objects list is updated to include the back wall 304 since no other intersecting object are along the depth direction. Since the back wall 304 is part of the first object 300, the perimeter of the first object 300 closest to the viewer is automatically re-highlighted.

Example 2

Example 2 will be described in relation to FIGS. 4A and 4B. Example 2 is illustrative of the tiebreaker procedure being performed on a tiebreaker set of objects and the use of application or context data to break the tie between the objects in the tiebreaker objects list.

Figure 4A:
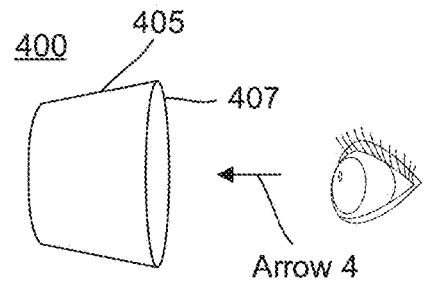
FIG. 4A illustrates a first object of a second set of 3D occluding objects.
Figure 4B:
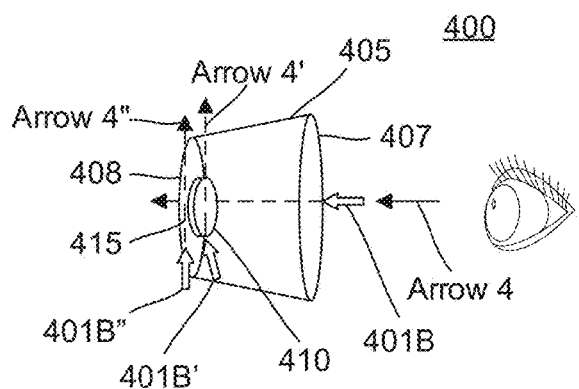
FIG. 4B illustrates the first object of the second set of 3D occluding objects being partially transparent and second and third occluding objects of the same size.

FIG. 4A illustrates a first object 405 of a second set of 3D occluding objects 400. The first object 405 is shown as a solid. The viewer is looking into a first end 407 of the first object 405. For the sake if illustrative purposes, FIG. 4B illustrates the first object 405 of the second set of 3D occluding objects 400 as being partially transparent so that second and third occluding objects 410 and 415 within the object 405 can be seen for discussion. From the perspective of the viewer looking through the first object 405 from the open front end 407, the object 410 may be seen by object 415 may be occluded or partially occluded.

The first object 405 includes a back wall 408. Also, assume the second and third occluding objects 410 and 415 are solid and approximately the same size. The back wall 408 of the first object 405 would have the largest screen area relative to objects 410 and 415. Thus, the viewer-interface, when the cursor 401 is placed at shared coordinates intersecting the first, second and third objects 405, 410 and 415 along the depth direction in the direction of arrow ARROW 4. Furthermore, the second and third objects 410 and 415 are tied based on their screen area size and may be placed in the tiebreaker objects list. The VI-PMOO 176 may select one of the second and third objects 410 and 415 based on one of object metadata, viewer interaction object data, application data and context data to break the tie so that one of the objects in the tiebreaker objects list is selected as a current prioritized object.

In some embodiments, object 405 may be partially transparent or solid (opaque).

In terms of application data and context, assume the second and third objects 410 and 415 are a bolt head and a washer, respectively, being recessed in a cavity of the first object 405. Each of the second and third objects 410 and 415 has substantially the same screen area along a depth direction. In terms of the application and context, the bolt head (i.e., object 410) may have higher priority than the washer (i.e., object 415). Therefore, the VI-PMOO 176 may select the bolt head with the higher priority based on metadata and/or context data in the tiebreaker procedure 260 (FIG. 2C) and all other objects being discarded from the tiebreaker list. Thus, the bolt head would be selected as the current prioritized object for further interaction by the viewer through a list of possible or permissible interactions.

Turning again to FIGS. 4A and 4B, assume the viewer is looking along a side of the first object 405. Since the first object 405 is solid, the second and third objects 410 and 415 would be occluded. The second object 410 may be selected if the cursor 401B' is placed or clicked over the area of the second object 410 seen in FIG. 4B in the direction of arrow ARROW 4'. Likewise, the third object 415 may be selected if the cursor 401B" is placed or clicked over the area of the third object 415 in the direction of arrow ARROW 4". In some virtual environments, the perspective view of an object may be manipulated using the VI-PMOO 176 so that different sides, ends or portions of an object may be changed. Based on the perspective view being viewed by the viewer on the screen of the display, the order of the prioritized object may change. In the direction of arrow ARROW 4' with the first object 405 partially transparent, object 410 would be the only solid object. In the direction of arrow ARROW 4", object 415 would be the only solid object.

Assuming the virtual environment is to teach maintenance of machinery using a simulated machine with interactive parts. Objects 405, 410 and 415 may be linked by metadata as well such that any objects outside of the first object 405 similar in size to objects 410 and 415 may be at a distance which allows such object(s) to be discarded in the tiebreaker procedure 260 (FIG. 2C), in some embodiments.

The manner in which the VI-PMOO 176 would manipulate an object to change a viewed perspective view on the screen is not part of this disclosure and can be performed using known techniques including sensors to sense a viewer's hand or finger position, eye gaze, etc.

Example 3

Figure 5A:
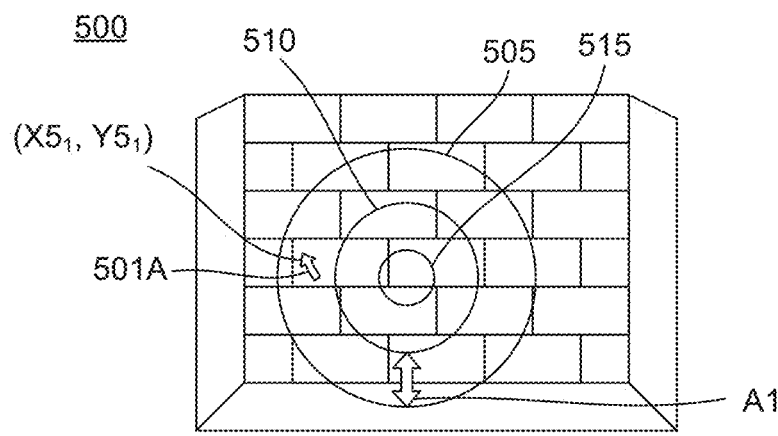
FIG. 5A illustrates the viewer-interface selecting a first object of a third set of partially transparent occluding objects.
Figure 5B:
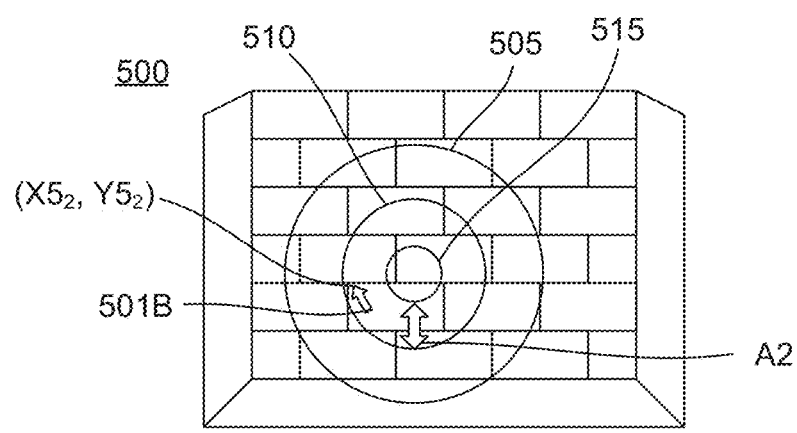
FIG. 5B illustrates the viewer-interface selecting a second object of a third set of partially transparent occluding objects.
Figure 5C:
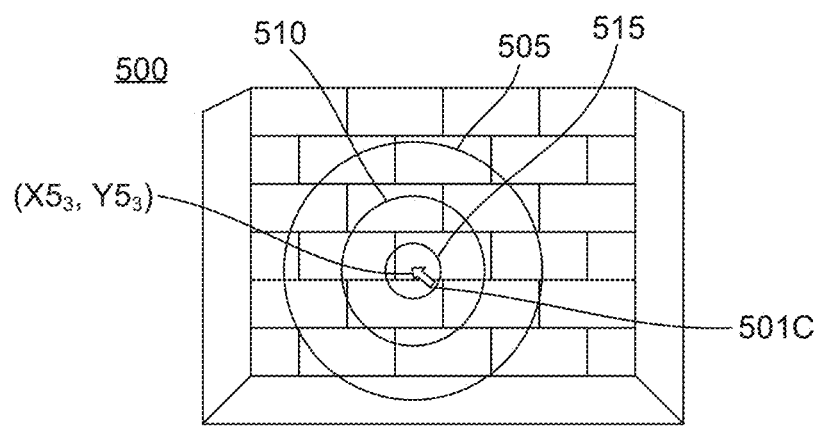
FIG. 5C illustrates the viewer-interface selecting third object of a third set of partially transparent occluding objects.

Example 3 is described in relation to FIGS. 5A-5C where the objects are partially transparent. Example 3 describes the operations of the VI-PMOO 176 to select partially transparent objects when all objects are partially transparent.

FIGS. 5A-5C illustrate a set of partially transparent occluding objects 500. The prioritizing of partially transparent occluding objects will be described. The set of partially transparent occluding objects, by way of non-limiting example, includes three (3) concentric circles or 3D spheres. The outer object being labeled 505, the inner object being labeled 515 and an intermediate object being labeled 510 wherein the intermediate object is between the outer object 505 and the inner object 515. The terms "outer," "inner," and "intermediate" are intended to provide a frame of reference.

The same terms may be substituted with first, third and second. The objects may be at least one of occluded and occluding.

FIG. 5A illustrates the viewer-interface selecting a first object of a set of partially transparent occluding objects. In this non-limiting example, a cursor 501A is shown. The cursor 501A is shown placed over on the outer object 505. Assume cursor 501A is located at coordinates $X5_1$, $Y5_1$. Because the outer object 505 is the largest with the largest screen area, no other objects of the set of partially transparent occluding objects 500 intersect along the depth direction. Thus, outer object 505 is selected and set as the current prioritized object. In some embodiments, the virtual environment may be configured to employ nested partially transparent objects which allows the viewer to locate a partially occluded object for selection in only that space associated with the object of interest.

The prioritization of the outer object 505 by the viewer-interface is activated either by a single click of the cursor 501A at coordinates $X5_1$, $Y5_1$, moving, or sliding the cursor 501A to the coordinates $X5_1$, $Y5_1$. Nonetheless, clicking, moving or sliding the cursor 501A anywhere in the concentric area A1 of the outer object 505 beyond the outer limits of the intermediate object 510 and with no other objects in the set of partially transparent occluding objects 500 along the corresponding depth direction allows the outer object 505 to remain selected, for example. The outer object 505 remains selected regardless of any subsequent clicks provided no other objects intersect along the depth direction at the point of click. By way of non-limiting example, the viewer is able to interact with the outer object 505 with the cursor 501A through at least one click, moving or sliding of the cursor to a location on the screen.

FIG. 5B illustrates the VI-PMOO 176 selecting a second object of a set of partially transparent occluding objects 500. In this non-limiting example, a cursor 501B is shown. The cursor 501B is shown placed over on the intermediate object 510. Assume cursor 501B is located at coordinates $X5_2$, $Y5_2$ with the outer object 505 and intermediate object 510 of the set of partially transparent occluding objects 500 intersecting in the depth direction. Thus, the second object (i.e., intermediate object 510) with a smaller surface is prioritized for selection over the outer object 505. In other words, the prioritized object of a set of mutually occluding objects is the smallest object along the depth direction for shared coordinates of the cursor 501B.

The prioritization of the intermediate object 510 by the viewer-interface is activated either by a single click of the cursor 501B at coordinates $X5_2$, $Y5_2$, moving or sliding the cursor 501B to the coordinates $X5_2$, $Y5_2$. Nonetheless, clicking, moving or sliding the cursor 501B anywhere in the concentric area A2 between the perimeters of the outer object 505 and the inner object 515, the intermediate object 501B being smaller than the outer object 505 with no other objects in the set of partially transparent occluding objects 500 along the corresponding depth direction allows the intermediate object 510 to remain selected. The intermediate object 510 may remain selected regardless of any subsequent clicks provided the intermediate object 510 is the smallest object that intersects along the depth direction at the point of click. By way of non-limiting example, the viewer is able to interact with the intermediate object 510 with the cursor 501B through at least one click, movement or sliding of the cursor to a location on the screen.

FIG. 5C illustrates the VI-PMOO 176 selecting third object 515 of a set of partially transparent occluding objects 500. In this non-limiting example, a cursor 501C is shown.

The cursor 501C is shown placed over on the inner object 515. Assume cursor 501C is located at coordinates $X5_3$, $Y5_3$, the outer object 505, intermediate object 510 and the inner object 515 of the set of partially transparent occluding objects 500 intersect along the depth direction. Thus, object (i.e., inner object 515) with the smallest surface is automatically set as the current prioritized object. In other words, the prioritized object of a set of mutually occluding objects is the smallest object along the depth direction for shared coordinates of the cursor 501C.

The prioritization of the inner object 515 by the viewer-interface is activated either by a single click of the cursor 501C at coordinates $X5_3$, $Y5_3$, moving or sliding the cursor 501C to the coordinates $X5_3$, $Y5_3$. Nonetheless, clicking, moving or sliding the cursor 501C anywhere in the area of the inner object 515 being the smallest in the set of partially transparent occluding objects 500 along the corresponding depth direction allows the inner object 515 to remain selected. The inner object 515 remains selected regardless of any subsequent clicks provided the inner object 515 is the smallest object that intersects along the depth direction at the point of click anywhere in the area A3 defined by geometric shape of the inner object 515, for example. By way of non-limiting example, the viewer is able to interact with the inner object 515 with the cursor 501C through at least one click, movement or sliding of the cursor to a location on the screen.

The partially transparent objects can be arranged along the depth direction in any order. For example, the first object 505 may be located at the deepest depth along the depth direction while the inner object 515 is located at the shallowest depth along the depth direction. Alternately, the intermediate object 510 may be located at any position. In the case of a fourth object being tied in screen area with the inner object 515, for example, a tiebreaker procedure 260 (FIG. 2C) is performed to select an object from the tiebreaker set based on at least one of object metadata, viewer interaction object data, application data and context data. For tied objects, the application data or context data may prioritize one of the tied objects of the tiebreaker objects list to be interacted with by the viewer before any other object in the tiebreaker objects list. The tiebreaker objects list includes a set of tied objects of relatively the same screen area.

Example 4

Figure 6A:
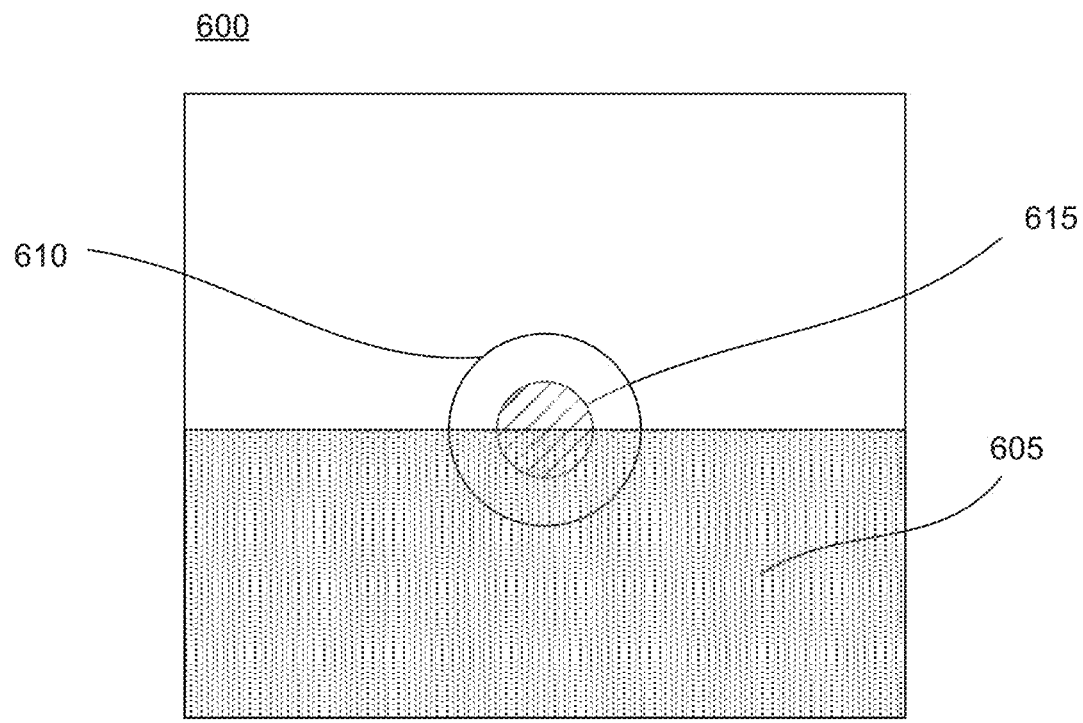
FIGS. 6A and 6B illustrate a fourth set of mutually occluding objects that are partially transparent.
Figure 6B:
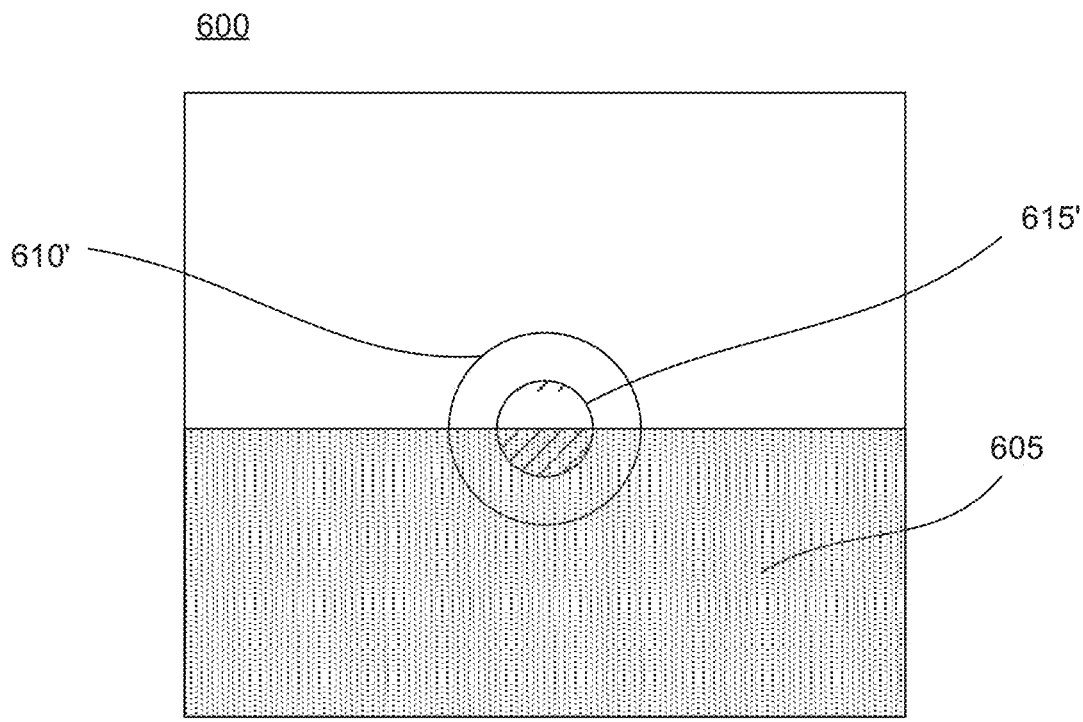

FIGS. 6A and 6B illustrate a fourth set of mutually occluding objects 600 that are partially transparent. Object 605 may be selected as the prioritized object when the cursor is clicked, moved or slid to the screen area of object 605, but not overlaying any of the objects 610 or 615. Likewise, object 610 may be selected as the prioritized object when the cursor is clicked, moved or slid anywhere in the area between the outer perimeter of object 610 and the outer perimeter of object 615 even if object 605 overlaps such area. Object 615 may be selected as the prioritized object when the cursor is clicked, moved or slid anywhere in the area of object 615 even if objects 605 and 610 overlaps such area. The arrangement of objects 605, 610 and 615 along the depth direction does not alter the prioritized object being selected. Assume that in FIG. 6A, object 610' is behind object 615'. In FIG. 6B, assume that object 610' is in front of object 615'. Object 610 and object 610' are the same object, but at a different location along the depth direction. Object 615 and object 615' are the same object, but at a different location along the depth direction.

FIG. 6C illustrates a pictorial arrangement of the fourth set of mutually occluding objects of FIGS. 6A and 6B. FIGS. 6D-6H illustrate possible size variations of two objects of the fourth set of mutually occluding objects of FIG. 6C.

FIGS. 6D-6G are side views, and their purpose is to show varying layouts that would result in the same perspective view shown in FIG. 6C. Even though objects 620 and 625 in FIG. 6E and object 620' and 625' of FIG. 6F have the same size in real-world space, these objects would be displayed as different sizes in screen space (from the viewer's perspective). Thus, if the cursor collides with both objects along the depth direction, the object with the smallest screen area will be prioritized (object 625). Thus, a tiebreaker procedure would not be necessary.

In the illustration of FIG. 6C, from the perspective of the viewer's view of the screen, object 610 is deeper along the depth direction in the direction of arrow ARROW 6 than object 615. In the illustration of FIG. 6D, from the perspective of the viewer's view of the screen, object 615' is deeper along the depth direction of arrow ARROW 6 than object 610', but adjacent to each other.

In the illustration of FIG. 6E, from the perspective of the viewer's view of the screen, objects 620 and 625 have the same size, but separated by distance D1. Thus, object 625 would be observed to have the size in screen space of object 615 in FIG. 6C. Object 620 would be observed to have the size in screen space of object 610.

In the illustration of FIG. 6F, from the perspective of the viewer's view of the screen, objects 620' and 625' have the same screen space size as objects 610 and 615, respectively.

In FIG. 6G, objects 630 and 635, as compared to objects 610 and 615, have a distance D2 between them. Object 610 and 615 are, by way of non-limiting example, adjacent and touching each other. Nonetheless, the screen area of the object 630 would appear substantially as the same screen area size of object 610 in screen space. Likewise, the screen area of object 635 would appear substantially as the same screen area size of the object 615 in screen space. In FIG. 6H, objects 630' and 635' would have substantially the same screen area size of the objects 610 and 615, respectively, in screen space.

By way of non-limiting example, the VI-PMOO 176 may use metadata about all of the objects under the cursor in FIGS. 3A-3D, 4A, 4B, 5A-5C and FIGS. 6A-6G, and context sensitivity or prioritization to further improve selection accuracy.

Figure 7:
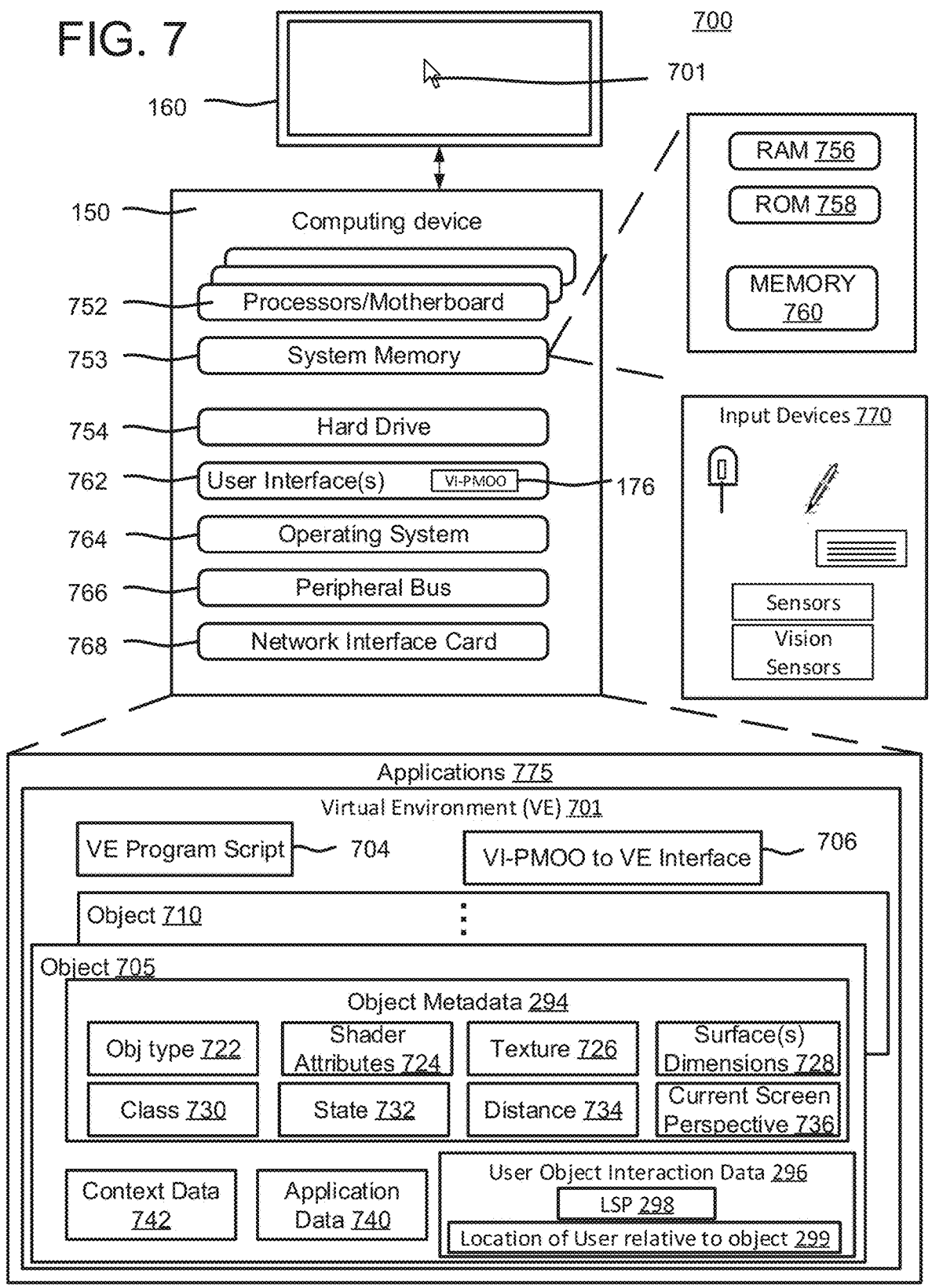
FIG. 7 illustrates a computing system for execution of program data of a virtual environment and a viewer-interface for prioritizing mutually occluding objects VI-PMOO.

FIG. 7 illustrates a computing system 700 having a computing device 150. The computing device 150 may include one or more processors 752, system memory 753 and hard drive 754. Depending on the exact configuration and type of a computing device 150, system memory 753 may be volatile (such as RAM 756), non-volatile (such as read only memory (ROM 758), flash memory 760, and the like) or some combination thereof. System memory 753 may store operating system 764, one or more applications 775, and may include program data for performing one or more operations, functions, methods and processes described herein. At least one of the processors 752 may include a graphical processing unit (GPU).

The computing device 150 may also have additional features or functionality. For example, the computing device 150 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of the device.

The computing device 150 may also include or have viewer-interfaces 762 for user/viewer input device(s) 770 such as a keyboard, mouse, pen, voice input device, touch input device, etc. The mouse functions may be incorporated in a mouse touchpad found on Laptops (i.e., computing device 150). The mouse functions may be incorporated into a mouse ring device. The mouse functions may be incorporated into a touch-sensitive display screen which determines a touchpoint by a finger of the viewer or a pen. Some display devices 160 may have a touch-sensitive display screen. The mouse functions may be incorporated into sensors which determine a location of a viewer's finger, hand gestures, or touchpoint relative to a location in holographic space or on a surface displaying the virtual environments. The virtual environments may be viewed and interacted with using an immersive head-mounted display apparatus. The virtual environments may be viewed and interacted with using a mixed reality head-mounted display apparatus. The VI-PMOO 176 may also interface with one or more viewer-interfaces 762. However, the VI-PMOO 176 (FIGS. 1A-1B) may be for virtual environments to select a prioritized object from mutually occluding objects and will be described in relation to applications 775. In some embodiments, the input device may include a vision system to track a viewer's movements, touchpoints and/or hand gestures for selection of a point in the screen area displayed by the virtual environment.

In some embodiments, the head-mount display apparatus can be, for example, an optical see-through, augmented reality, binocular viewer, monocular viewers, video see-through, and binocular and monocular "virtual reality" systems.

The computing device 150 may include or have interfaces for connection to output device(s) such as at least one display device 160 via display drivers, speakers, etc. The computing device 150 may include a peripheral bus 766 for connecting to peripherals. The computing device 150 may contain communication connection(s) that allow the communication systems to communicate with other computing devices, such as over a network or a wireless network. By way of example, and not limitation, communication connection(s) and protocols may be compatible with wired media such as a wired network or direct-wired connection, and wireless media such as acoustic, radio frequency (RF), infrared and other wireless media of the communication system. The computing device 150 may include a network interface card 768 to connect (wired or wireless) to a network.

While the description herein describes the computing device 150 in terms of a personal computer (PC), Tablet, Laptop, etc., the computing device 150 may be a webserver configured to execute web server applications and the programmed instructions for the virtual environment. In some embodiments, a virtual environment may be executed by the webserver during an online session by the viewer through the Internet.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The applications 775 may include a virtual environment 701. The virtual environment 701 may be a simulator. By way of non-limiting example, the virtual environment 701 may include a virtual trainer for pilots, doctors, medical professions, researchers, first responders, oil field workers, power plant workers, astronauts, train conductors, soldiers, drivers, etc. to learn how to use and operate machinery, such as complex machinery. The virtual trainer may include a virtual maintenance trainer for learning maintenance of a vehicle or machinery, such as without limitation, a car, weapons, airplane, truck, bus, commercial vehicle, spacecraft or a military vehicle. The virtual environment, via a VE program script 704, may include medical training such as for doctors, nurses, phlebotomist, or other medical professionals. The virtual maintenance trainer, via a VE program script 704, may include a plurality of objects configured to simulate a vehicle to teach a mechanic how to repair parts of the vehicle, by way of non-limiting example. The virtual environment, via a VE program script 704, may train professionals to perform a particular job through the interaction of certain objects, machines, etc.

The virtual environment 703 may include a virtual environment database (VED) 292 (FIG. 2C) with stored objects 705, . . . , 710. The stored objects may include object metadata 294 for each object in the virtual environment 701, application data 740 and context data 742 stored in the virtual environment database (VED) 292 (FIG. 2C).

The application data varies based on the purpose of the virtual environment (VE). The application data may include attributes describing the purpose of the real-world object that is depicted by the virtual 3D models, such as mass, material of composition, object type (fastener, structure, mechanical), etc. In these examples, fasteners may have more priority than a structure, for example, or light weight objects have higher priority than very massive objects. The point here is that it is application-specific.

The context data may be based on the current state of the viewer and/or virtual 3D objects. For example: which step of a procedure the viewer is currently on, the location of the viewer, the amount of time that has passed since some key event, etc. This is also application-specific but is more tightly paired to the current state of the environment in relation to the selectable objects.

The virtual environment 703 may also track the state 732 of the object and update the VED 292 (FIG. 2C) with current state data. Thus, when an object is listed in a candidate objects list or a tiebreaker objects list, the current state 732 of the object may be used by the VI-PMOO 176. For each object, the virtual environment 701 may include surface dimensions 728 for each side of the object whether in 2D space or 3D space so that the VI-PMOO 176 can access the dimensions of the object for calculating the current screen area of the object. The VE 701 may include pixel data 744 for each object which can be retrieved and read by the VI-PMOO 176. The object metadata 294 may include at least one of object type 722, shader attributes 724, and texture 726. The object metadata 294 may include at least one of class 730, distance 734, and current screen perspective 736.

The virtual environment 701 may include other programming instructions which when executed displays the virtual environment. In some embodiments, the virtual environment is a simulator which is configured to simulate machinery in a manner to be experienced by the viewer as if interacting with the actual machinery.

The virtual environment (VE) 701 may include a VI-PMOO to VE interface 706 to provide the VI-PMOO 706 the objects metadata, so that the VI-PMOO 176 can provide back to the VE 701 the selected prioritized object associated with the cursor's point in the screen area. Thereafter, the VE manipulates the object in accordance with the application data, context data or program script. The VI-PMOO 176 is configured to interface with the virtual environment 701 to access the data necessary to carry out the methods described herein and interact with the virtual environment 701 upon execution or compilation.

In some embodiments, the virtual environment 701 may include the VI-PMOO 176.

Figure 8:
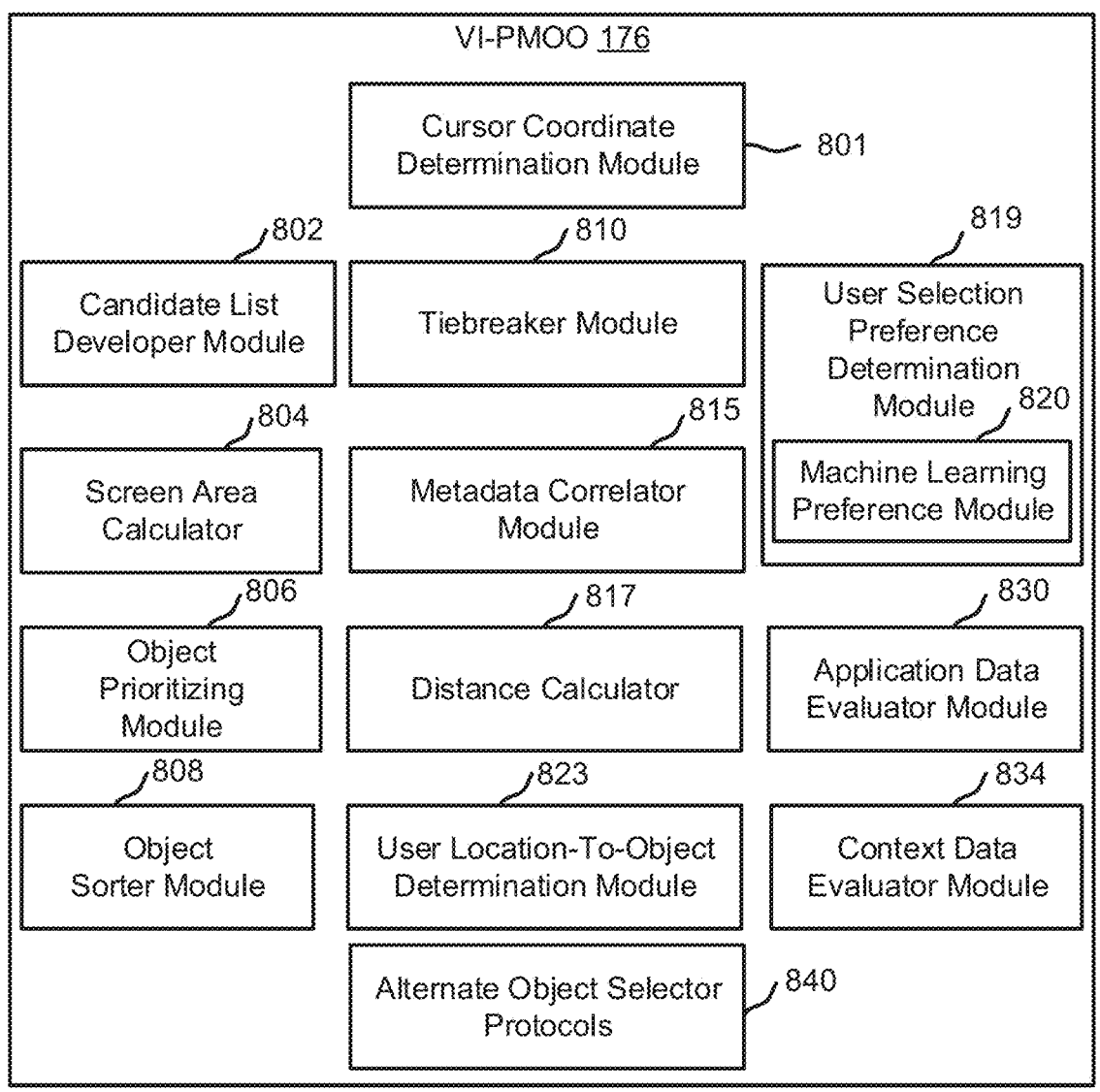
FIG. 8 illustrates a VI-PMOO for prioritizing an object from a set of mutually occluding objects.

FIG. 8 illustrates a VI-PMOO 176 for prioritizing an object from a set of mutually occluding objects. The VI-PMOO 176 may include a candidate list developer module 802 based on the current cursor location, a touchpoint, or viewer's input for selecting an object in the virtual environment, as described in relation to blocks 201-212 in FIG. 2A. The VI-PMOO 176 may include a cursor coordinate determination module 801 to determine shared coordinates based on a detected point of the cursor, such as after a click of the cursor or placement of a detected touchpoint. The VI-PMOO 176 may include a screen area calculator 804 for calculating the screen area of the objects in the candidate objects list, in relation to block 230 in FIG. 2B. The VI-PMOO 176 may include an object sorter module 808 to sort objects in the lists by screen area or other priority indicators. The VI-PMOO 176 may include an object prioritizing module 806 to set an object to the current prioritized object, associate with the cursor and highlight the object, once set. In some instances, the current prioritized object is revealed under mutually occluding objects by object prioritizing module 806. An example of a revealed object is shown in FIGS. 5A-5C. The VI-PMOO 176 may include a tiebreaker module 810 to break a tie between objects of similar screen areas based on the tiebreaker procedure 260 (FIG. 2C). The VI-PMOO 176 may include a metadata correlator module 815 to evaluate and correlate metadata of an object during a tiebreaker procedure or to improve object selection in general, such as at blocks 231 or 264. The VI-PMOO 176 may include an object distance calculator 817 to determine if an object can be removed from a list based on its distance. The VI-PMOO 176 may include a viewer selection preference determination module 819 having a machine learning module 820 to learn a viewer's preference for selecting an object based on passed use of the virtual environment or other virtual environments. The VI-PMOO 176 may include a viewer location-to-object determination module 823 configured to determine a location 299 of the viewer relative to the displayed object or current perspective of the object in the virtual environment as displayed on the display screen as described in relation to as described in relation to FIGS. 6C-6F.

The VI-PMOO 176 may include an application data evaluator module 830 for evaluating the application data associated with objects in relation to block associated in the tiebreaker procedure 260 in FIG. 2C. The VI-PMOO 176 may include a context data evaluator module 834 to evaluate the context data in relation to block associated in the tiebreaker procedure 260 in FIG. 2C.

The VI-PMOO 176 may include at least one alternate object selector protocol 840 to select an alternate viewer-interface selection protocol such as from the Table 1 using an input device. The VI-PMOO 176 may provide a drop-down list or a window to allow the viewer to navigate and select another type of object selector. The viewer may be offered at least one alternate object selector.

In view of the foregoing description, the VI-PMOO 176 is configured to improve the functionality of the computing device by improving the selection of an object by a viewer in an environment with mutually occluding objects, hidden or partially hidden, using a minimum number of clicks to reveal and highlight the object and begin interaction of the highlighted object. The minimum number of clicks may include no clicks as the method 200 may be triggered or initiated based on frame rendering for the current location the cursor or touchpoint to develop the objects list based on the current location from which the current prioritized object may be determined. The minimum number of clicks may include a single click in the screen area over at least one object to trigger or activate the method 200.

Thus, the method 200 may be initiated or triggered based on at least one of a touchpoint of a finger of the viewer on the screen of the display device, a touchpoint on the screen from a pen, a location of a cursor on the screen, a click location of the cursor displayed overlaid on the virtual environment and frame rendering associated with the virtual environment.

Table 1 below are examples of alternate selector protocols using input devices for associating an object with a cursor.

TABLE 1

| Alternate Object Selector | Description |
|---|---|
| Toggle Selector | Viewer clicks in the same location multiple times so that objects behind the cursor are selected one at a time until a desired object highlighted. When the viewer clicks after the last object behind the cursor, the first object is re-selected (highlighted). |
| Change of View | Viewer changes the current view to a view which allows for selection of the desired object. Parallax causes closer objects to appear to move faster than farther objects. Thus, a small movement will unobscured more distant objects. The viewer is able to change a camera's position or rotation in 3D space. |
| Disabling or moving objects | Viewer moves or hides one object to reveal an occluded object through viewer interactions with the object using the viewer-interface. Then, the viewer selects the revealed (previously occluded) object. |
| 3D cursor | Viewer varies a depth values to select an object at the designated depth |

TABLE 1-continued

| Alternate Object Selector | Description |
|---|---|
| 3D cursor with additional degrees of freedom | Viewer is provided control features through additional input to control aspects such as curvature of selection ray, volume of selection area, time spent hovering over objects, etc. |
| Spread and splatter | Objects that are behind the cursor can be selected by clicking the object stack by the viewer which are then spread-out visually, so the viewer can then select the desired object from the set of spread apart objects. |
| Objects listing | Viewer clicks wherein if only one object is behind the cursor, the one object is selected. If more than one object is behind the cursor an objects list is displayed to the viewer. The viewer is then required to read the list and select the object desired from the displayed list. |

The use of the term "cursor" herein is intended to include the selector mechanism of viewer input devices. The cursor may be substituted with hand gestures, touchpoint, pen point, finger point, etc.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

We claim:

1. A computer-implemented method comprising:
   detecting, by a processor having a graphical processing unit and coupled to a display device, a point location selected via a viewer input device within a screen of the display device displaying a virtual environment having a plurality of three dimensional (3D) objects, wherein some 3D objects of the plurality of 3D objects when displayed on the display device are mutually occluded 3D objects or partially occluded 3D objects;
   determining, by the processor, coordinates (XS, YS) of the point location on the screen; and a depth direction (ZS) defining a path through the point location along a direction of an eye gaze of a viewer;
   determining, by the processor, a set of 3D objects of the plurality of 3D objects sharing coordinates (XS, YS) on the screen and located along the depth direction (ZS), determining the set of 3D objects includes determining a depth value for each 3D object of the set of 3D objects;
   prioritizing, by the processor, at least two 3D objects from the set of 3D objects based on screen areas of the set of 3D objects, transparency of the set of 3D objects, depth values of the set of 3D objects, and opaqueness of at least one 3D object of the set of 3D objects currently displayed to improve selection of at least one of mutually occluded 3D objects and mutually partially occluded 3D objects in the virtual environment, the screen areas of the set of 3D objects determined using actual dimensions of the set of 3D objects in the virtual environment;
   selecting, by the processor, a first 3D object from the at least two 3D objects based on a number of previous actions performed on the first 3D object via the viewer input device being greater than a number of actions performed on a second 3D object of the at least two 3D objects when the first 3D object was included in one or more previous sets of 3D objects while sharing previous coordinates on the screen and located along previous depth directions; and
   establishing, by the processor, the selected first 3D object with the viewer input device for detecting interactions with the selected first 3D object displayed on the display device by the viewer input device, the selected first 3D object being updated on the screen of the display device based on the interactions.

2. The method of claim 1, wherein prioritizing the at least two 3D objects further comprises determining, by the processor, whether the at least two 3D objects of the set of 3D objects have screen areas equal to, within a tolerance of, a smallest screen area of the set of 3D objects.

3. The method of claim 2, wherein selecting the first 3D object includes retrieving, by the processor, respective numbers of previous actions for each 3D object of the at least two 3D objects.

4. The method of claim 1, wherein the set of 3D objects are transparent; and
   wherein prioritizing, by the processor, the at least two 3D objects from the set of 3D objects includes setting, by the processor, the at least two 3D objects as any transparent 3D object with a smallest screen area of other transparent 3D objects in the set of 3D objects.

5. The method of claim 1, wherein the detecting of the point location comprises detecting, by the processor, at least one of a touchpoint of a finger of the viewer on the screen of the display device, a touchpoint on the screen from a pen, a location of a cursor on the screen, a click location of the cursor displayed overlaid on the virtual environment and frame rendering associated with the virtual environment.

6. The method of claim 1, wherein:
   prioritizing, by the processor, the at least two 3D objects from the set of 3D objects includes:
      determining, by the processor, a first opaque object of the set of 3D objects;
      developing, by the processor, a candidate 3D objects list of 3D objects of the set of 3D objects which are located along the depth direction ($Z_S$) and have depth values smaller than or equal to a depth value of the first opaque object of the set of 3D objects;
      determining, by the processor, the screen area of said 3D objects in the candidate 3D objects list; and
      setting the at least two 3D objects as any 3D object with a smallest screen area of other 3D objects in the candidate 3D objects list.

7. A tangible and non-transitory computer readable medium having program instructions which, when executed by a processor having a graphical processing unit, causes the processor with the graphical processing unit to:
   detect a point location selected via a viewer input device within a screen of the a display device displaying a virtual environment having a plurality of three dimensional (3D) objects, wherein some 3D objects of the plurality of 3D objects when displayed on the display device are mutually occluded 3D objects or partially occluded 3D objects;
   determine coordinates ($X_S$, $Y_S$) of the point location on the screen and a depth direction ($Z_S$) defining a path through the point location along a direction of an eye gaze of a viewer;
   determine a set of 3D objects of the plurality of 3D objects sharing the coordinates ($X_S$, $Y_S$) on the screen and located along the depth direction ($Z_S$), determining the set of 3D objects includes determining a depth value for each 3D object of the set of 3D objects;
   prioritize at least two 3D objects from the set of 3D objects based on screen areas of the set of 3D objects, transparency of the set of 3D objects, depth values of the set of 3D objects, and opaqueness of at least one 3D object of the set of 3D objects currently displayed to improve selection of at least one of mutually occluded 3D objects and mutually partially occluded 3D objects in the virtual environment, the screen areas of the set of 3D objects determined using actual dimensions of the set of 3D objects in the virtual environment;
   select a first 3D object from the at least two 3D objects based on a number of previous actions performed on the first 3D object via the viewer input device being greater than a number of actions performed on a second 3D object of the at least two 3D objects when the first 3D object was included in one or more previous sets of 3D objects while sharing previous coordinates on the screen and located along previous depth directions; and
   establish the selected first 3D object with the viewer input device for detecting interactions with the selected first 3D object displayed on the display device by the viewer input device, the selected first 3D object being updated on the screen of the display device based on the interactions.

8. The non-transitory computer readable medium of claim 7, wherein the program instructions which prioritize the at least two 3D objects further comprise program instructions which, when executed, cause the processor with the graphical processing unit to determine whether the at least two 3D objects of the set of 3D objects have screen areas equal to, or within a tolerance of, a smallest screen area of the set of 3D objects.

9. The non-transitory computer readable medium of claim 8, wherein the program instructions to select the first 3D object further comprise program instructions which when executed cause the processor with the graphical processing unit to retrieve respective numbers of previous actions for each 3D object of the at least two 3D objects.

10. The non-transitory computer readable medium of claim 7, wherein the set of 3D objects are transparent; and
wherein the program instructions to prioritize the at least two 3D objects from the set of 3D objects further comprise program instructions which, when executed, cause the processor with the graphical processing unit to set the at least two 3D objects as any transparent 3D object with a smallest screen area of all other transparent 3D objects in the set of 3D objects.

11. The non-transitory computer readable medium of claim 7, wherein the program instructions to detect the point location further comprise program instructions which, when executed, cause the processor with the graphical processing unit to detect at least one of a touchpoint of a finger of the viewer on the screen of the display device, a touchpoint on the screen from a pen, a location of a cursor on the screen, a click location of the cursor displayed overlaid on the virtual environment and frame rendering associated with the virtual environment.

12. The non-transitory computer readable medium of claim 7, wherein the program instructions to prioritize the at least two 3D objects from the set of 3D objects further comprise program instructions which, when executed, cause the processor with the graphical processing unit to:
determine a first opaque object of the set of 3D objects;
develop a candidate 3D objects list of 3D objects of the set of 3D objects which are located along the depth direction ($Z_S$) and have depth values smaller than or equal to a depth value of the first opaque object of the set of 3D objects;
determine the screen area of said 3D objects in the candidate 3D objects list; and
set the at least two 3D objects as any 3D object with a smallest screen area of other 3D objects in the candidate 3D objects list.

13. A system comprising:
a display device configured to display a virtual environment having a plurality of three dimensional (3D) objects, wherein some 3D objects of the plurality of 3D objects when displayed on the display device are mutually occluded 3D objects or partially occluded 3D objects; and
a processor having a graphical processing unit and configured to:
cause display of the plurality of 3D objects of the virtual environment on a screen of the display device;
detect a point location selected via a viewer input device within the screen of the display device displaying the virtual environment;

determine coordinates ($X_S$, $Y_S$) of the point location on the screen and a depth direction ($Z_S$) defining a path through the point location along a direction of an eye gaze of a viewer;
determine a set of 3D objects of the plurality of 3D objects sharing the coordinates ($X_S$, $Y_S$) and located along the depth direction ($Z_S$), determining the set of 3D objects includes determining a depth value for each 3D object of the set of 3D objects;
prioritize at least two 3D objects from the set of 3D objects based on screen areas of the set of 3D objects, transparency of the set of 3D objects, depth values of the set of 3D objects, and opaqueness of at least one 3D object of the set of 3D objects currently displayed to improve selection of at least one of mutually occluded 3D objects and mutually partially occluded 3D objects in the virtual environment, the screen areas of the set of 3D objects determined using actual dimensions of the set of 3D objects in the virtual environment;
select a first 3D object from the at least two 3D objects based on a number of previous actions performed on the first 3D object via the viewer input device being greater than a number of actions performed on a second 3D object of the at least 3D objects when the first 3D object was included in one or more previous sets of 3D objects while sharing previous coordinates on the screen and located along previous depth directions; and
establish the selected first 3D object with the viewer input device for detecting interactions with the selected first 3D object displayed on the display device by the viewer input device, the selected first 3D object being updated on the screen of the display device based on the interactions.

14. The system of claim 13, wherein the processor with the graphical processing unit is configured to determine whether the at least two 3D objects of the set of 3D objects have screen areas equal to, or within a tolerance of, a smallest screen area of the set of 3D objects.

15. The system of claim 14, wherein the processor having the graphical processing unit is configured to retrieve respective numbers of interactions for each 3D object of the at least two 3D objects.

16. The system of claim 13, wherein the set of 3D objects are transparent; and
wherein the processor with the graphical processing unit is configured to set the at least two 3D objects as any transparent 3D object with a smallest screen area of other transparent 3D objects in the set of 3D objects.

17. The system of claim 13, wherein the processor with the graphical processing unit is configured to detect at least one of a touchpoint of a finger of the viewer on the screen of the display device, a touchpoint on the screen from a pen, a location of a cursor on the screen, a click location of the cursor displayed overlaid on the virtual environment and frame rendering associated with the virtual environment.

18. The system of claim 13, wherein the processor with the graphical processing unit is configured to:
determine a first opaque 3D object of the set of 3D objects;
develop a candidate 3D objects list of 3D objects of the set of 3D objects which are located along the depth direction ($Z_S$) and have depth values smaller than or equal to a depth value of the first opaque 3D object;
determine the screen area of said 3D objects in the candidate 3D objects list; and set the at least two 3D objects as any 3D object with a smallest screen area of other 3D objects in the candidate 3D objects list.

\* \* \* \* \*